(12) United States Patent
Donovan

(10) Patent No.: US 12,172,085 B2
(45) Date of Patent: Dec. 24, 2024

(54) ETHICAL AI DEVELOPMENT PLATFORM AND METHODS FOR USE THEREWITH

(71) Applicant: Virtuous AI, Inc., Los Gatos, CA (US)

(72) Inventor: Rory Donovan, Arroyo Grande, CA (US)

(73) Assignee: Virtuous AI, Inc., Campbell, CA (US)

( * ) Notice: Subject to any disclaimer, the term of this patent is extended or adjusted under 35 U.S.C. 154(b) by 0 days.

(21) Appl. No.: 18/471,806

(22) Filed: Sep. 21, 2023

(65) Prior Publication Data

US 2024/0009575 A1 Jan. 11, 2024

Related U.S. Application Data

(63) Continuation of application No. 17/176,751, filed on Feb. 16, 2021, now Pat. No. 11,806,629.

(60) Provisional application No. 62/993,818, filed on Mar. 24, 2020.

(51) Int. Cl.
*A63F 13/79* (2014.01)
*A63F 13/75* (2014.01)
*G06N 3/045* (2023.01)
*G06N 5/04* (2023.01)

(52) U.S. Cl.
CPC .............. *A63F 13/79* (2014.09); *A63F 13/75* (2014.09); *G06N 3/045* (2023.01); *G06N 5/04* (2013.01)

(58) Field of Classification Search
None
See application file for complete search history.

(56) References Cited

U.S. PATENT DOCUMENTS

| | | |
|---|---|---|
| 8,221,238 B1 | 7/2012 | Shaw |
| 10,671,854 B1 | 6/2020 | Mahyar |
| 10,905,962 B2 | 2/2021 | Kaethler |
| 11,052,311 B2 | 7/2021 | Bleasdale |
| 2006/0121990 A1 | 6/2006 | O'Kelley |
| 2006/0247055 A1 | 11/2006 | O'Kelley |
| 2006/0287096 A1 | 12/2006 | O'Kelley |
| 2009/0234663 A1 | 9/2009 | McCann |
| 2009/0325709 A1 | 12/2009 | Shi |
| 2019/0213498 A1 | 7/2019 | Adjaoute |
| 2019/0238934 A1 | 8/2019 | Yun |

(Continued)

*Primary Examiner* — Seng H Lim
(74) *Attorney, Agent, or Firm* — Garlick & Markison; Bruce E. Stuckman

(57) ABSTRACT

An ethical AI development platform operates by: facilitating the development of a training dataset; providing access to auto machine learning tools to facilitate the development of an AI model; providing access to machine learning analysis tools to facilitate the evaluation of the AI model, wherein the machine learning analysis tools include an AI moral insight model that generates predicted moral score data associated with the AI model, wherein the AI moral insight model is trained based on at least one-hundred thousand sets of training data, wherein the training data includes reviewed media content and moral score data associated with moral indices, wherein the moral indices include: a degree of immorality/morality, a degree of betrayal/loyalty, a degree of degradation/sanctity, a degree of harm/care a degree of cheating/fairness and a degree of subversion/authority; and providing access to a version control repository for storing versions of the training dataset and the AI model.

20 Claims, 18 Drawing Sheets

(56) References Cited

U.S. PATENT DOCUMENTS

| | | |
|---|---|---|
| 2019/0266912 A1 | 8/2019 | Barzman |
| 2019/0291008 A1 | 9/2019 | Cox |
| 2020/0078688 A1 | 3/2020 | Kaethler |
| 2020/0142999 A1 | 5/2020 | Pedersen |
| 2020/0364727 A1 | 11/2020 | Scott-Green |
| 2021/0004440 A1 | 1/2021 | Purnell |
| 2021/0038979 A1 | 2/2021 | Bleasdale |
| 2021/0168166 A1 | 6/2021 | Liu |
| 2022/0377083 A1 | 11/2022 | Kim |
| 2023/0114826 A1* | 4/2023 | Donovan ............... G06F 9/451 706/11 |

* cited by examiner

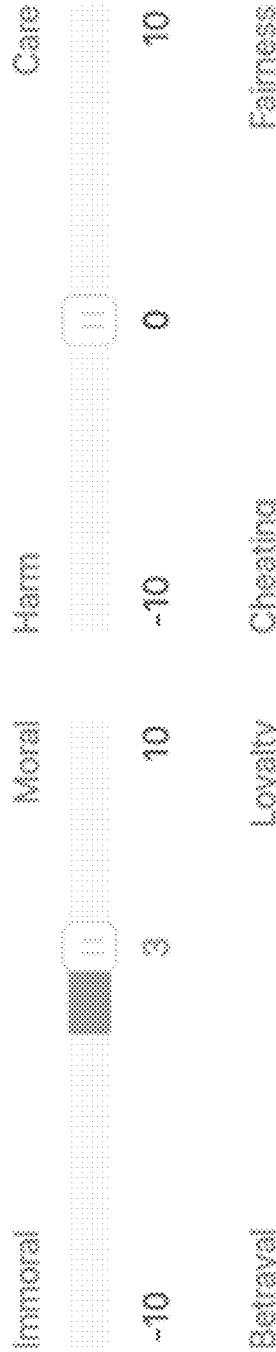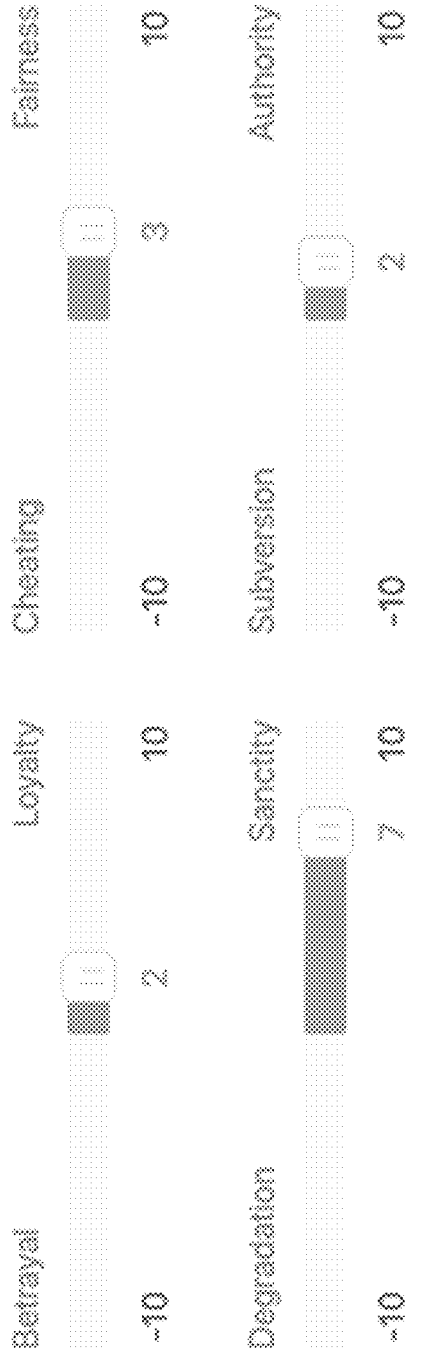
FIG. 3B
325
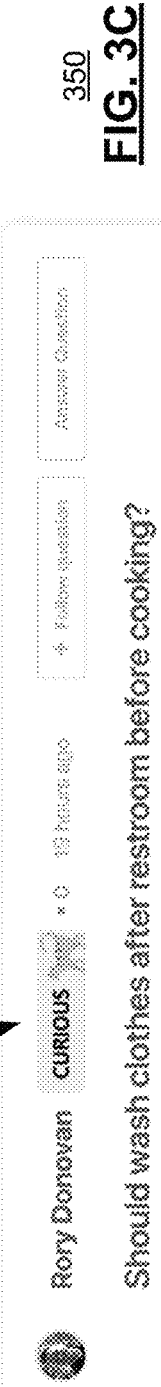
FIG. 3C
350

600

Ethical AI Framework 900

1110

1120

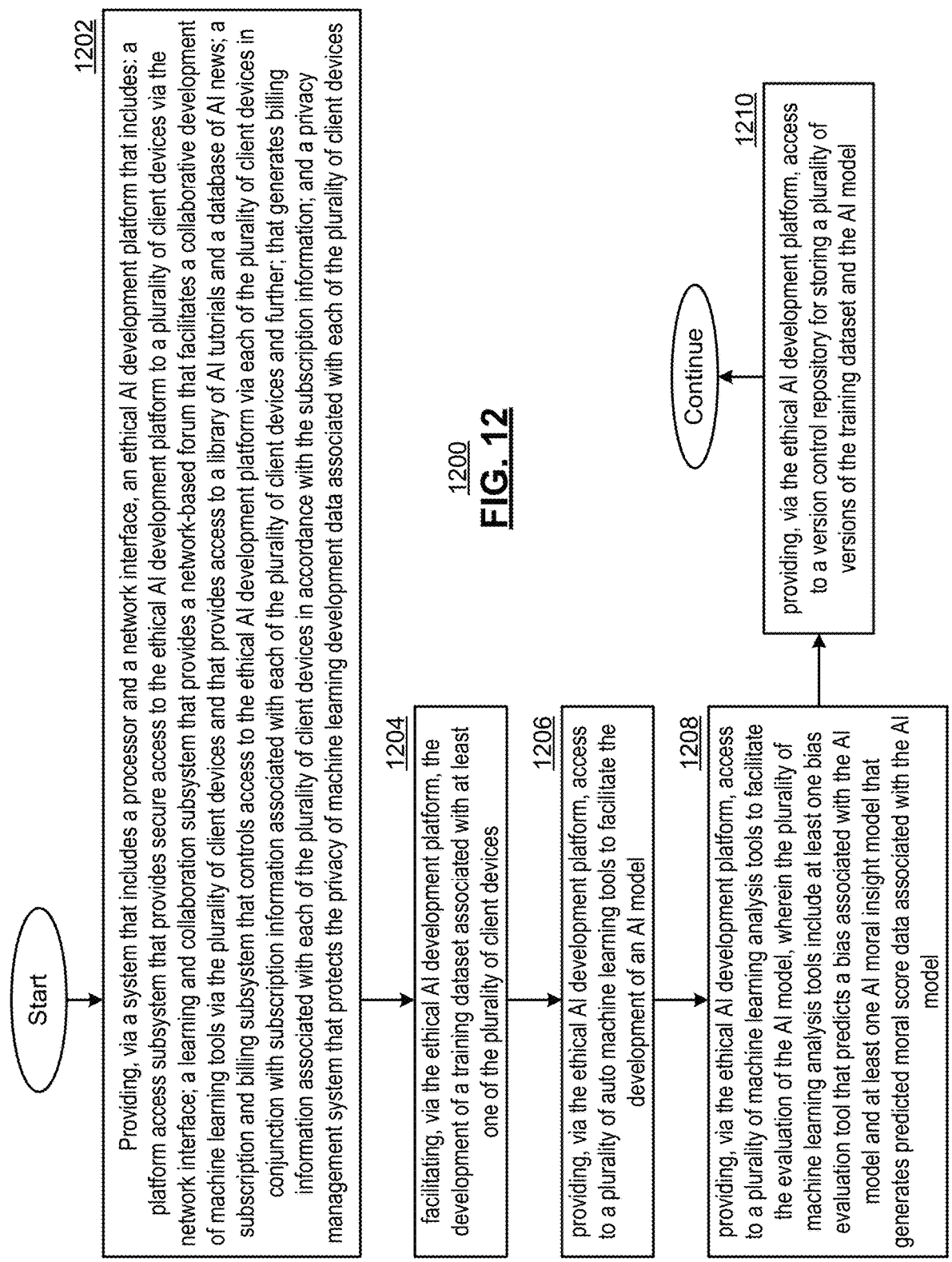

ETHICAL AI DEVELOPMENT PLATFORM AND METHODS FOR USE THEREWITH

CROSS REFERENCE TO RELATED PATENTS

The present U.S. Utility patent application claims priority pursuant to 35 U.S.C. § 120 as a continuation of U.S. Utility application Ser. No. 17/176,751, entitled "ARTIFICIAL INTELLIGENCE MODELS FOR MORAL INSIGHT PREDICTION AND METHODS FOR USE THEREWITH", filed Feb. 16, 2021, which claims priority pursuant to 35 U.S.C. § 119(e) to U.S. Provisional Application No. 62/993,818, entitled "ARTIFICIAL INTELLIGENCE MODELS FOR MORAL INSIGHT PREDICTION AND METHODS FOR USE THEREWITH", filed Mar. 24, 2020, both of which are hereby incorporated herein by reference in their entirety and made part of the present U.S. Utility patent application for all purposes.

TECHNICAL FIELD

The present disclosure relates to processing systems and applications used in the development, training and/or use of artificial intelligence models, gaming systems and other devices.

BRIEF DESCRIPTION OF THE SEVERAL VIEWS OF THE DRAWINGS

FIG. 3B presents a graphical diagram representation of a portion of a screen display in accordance with an embodiment of the present disclosure.

FIG. 3C presents a graphical diagram representation of a portion of a screen display in accordance with an embodiment of the present disclosure.

FIG. 12 presents a flowchart representation of a method in accordance with an embodiment of the present disclosure.

DETAILED DESCRIPTION

Figure 1:
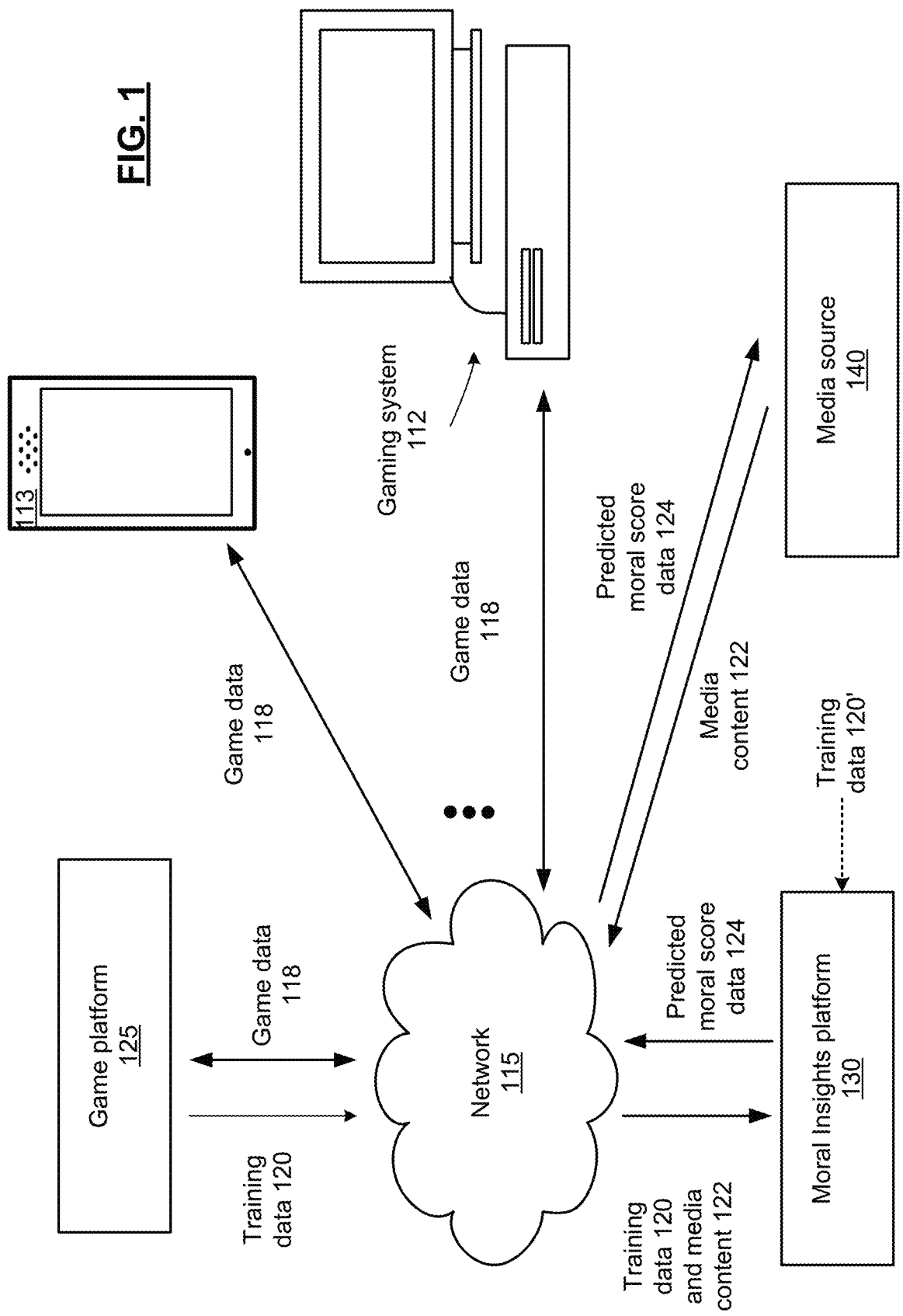
FIG. 1 presents a block diagram representation of a system in accordance with an embodiment of the present disclosure.

FIG. 1 presents a block diagram representation of a system in accordance with an embodiment of the present disclosure. In particular, a game platform 125 is presented that communicates game data 118 via network 115 with gaming devices such as mobile device 113 and gaming system 112 via network 115. The network 115 can be the Internet or other wide area or local area network. The game platform 125 can be used in the operation of a gaming application and further in the generation, development, and testing of training data 120. In various embodiments, the gaming application is a moral insights gaming application or other gaming application that presents media content, including but not limited to, audio, text, images, graphics, video and/or other media content to the gaming devices. This media content is rated, scored, discussed, evaluated, analyzed or otherwise reviewed in the game by users of the gaming devices via interaction with graphical user interfaces generated by their corresponding gaming devices in conjunction with the gaming application.

In an example of operation, the game platform 125 sends and receives game data 118 associated with a gaming application. The game data 118 can include, for example, a gaming application that is presented to the gaming devices for play, media content for review, game data and/or game output that is sent to the gaming devices for display via a graphical user interface. Furthermore, the game data 118 sent from the gaming devices to the game platform 125 can include other game output, including but not limited to the reviewed media content as well as moral score data associated with moral index data that indicates one or more moral indices or factors associated with each instance of the reviewed media content. The game data 118 can be sorted, formatted and/or otherwise processed by the game platform 125 to generate the training data 120 that includes the reviewed media content and the corresponding moral score data.

The game platform 125 sends the training data 118 to a moral insights platform 130 that generates an AI moral insight model. The training data 120 received by the moral insights platform 130 is used to facilitate the training of the AI moral insight model—based on the training data 120. In addition, or in the alternative, other training data 120 can be received from other sources, such as training data 120' generated via polls, studies, questionnaires and/or other mechanisms where media content is rated, scored, discussed, evaluated, analyzed or otherwise reviewed. The training data 120' can include this other media content as well as moral score data associated with moral index data that indicates one or more moral indices or factors associated with each instance of this other media content.

Once the moral insights platform 130 generates/trains the AI moral insight model, the moral insights platform 130 receives new media content 122 from a media source 140 for evaluation by the model. The moral insights platform 130 utilizes the AI moral insight model to generate predicted moral score data 124 associated with the new media content 122 corresponding to the at least one moral index. This predicted moral score data 124 is sent to the media source 140 and can be compared with one or more moral index thresholds, for example, to block content with that compares unfavorably to such threshold(s) and/or to validate, certify or allow content that compares favorably to such threshold(s).

The systems described herein provide several improvements to the technology of social media platforms and other media sources 140. The game platform 125 not only provides an engaging environment for players, it also serves to capture a population's moral taste receptors, which can be used, for example, for ad targeting. The idea is that certain populations have different affinities for different opinions. If you can predict how content is going to be received, you can produce more potent content. The AI moral insights model of the moral insights platform 130 operates via "artificial" intelligence—i.e. m ac hi nein on-hum an intelligence by automatically analyzing new content and making accurate predictions as to a number of moral indices, in a fashion that could not practically be performed in the human mind.

The moral insights platform 130 operates faster, more efficiently and more consistently and subjectively than humans in this regard. Additionally, social media companies and other media sources 140 are beginning to be held responsible for posts (e.g. —Christchurch shooting broadcasted on Facebook). The ability to understand moral dialect enables better policing of posted media. This can help decrease the propagation of hate speech and violence by performing audits and providing content filtration. This use of artificial intelligence via machine(s) reduces the cost of employing humans to sort through masses of data to identify subjectively harmful/objectionable content. It should be noted that, training of the AI moral insights model based on thousands, tens of thousands, hundreds of thousands, etc. sets of training data, via machine learning, is also a process that could not practically be performed in the human mind.

It should be noted, that while the game platform 125, moral insights platform 130 and media source 140 are shown as separate entities, other configurations are possible where two or more of these entities share a common platform and/or are implemented in a cloud computing configuration or other implementation. The further operation of these systems will be described in greater detail in conjunction with FIGS. 2-12 that follow, including several optional functions and features and examples thereof.

Figure 2:
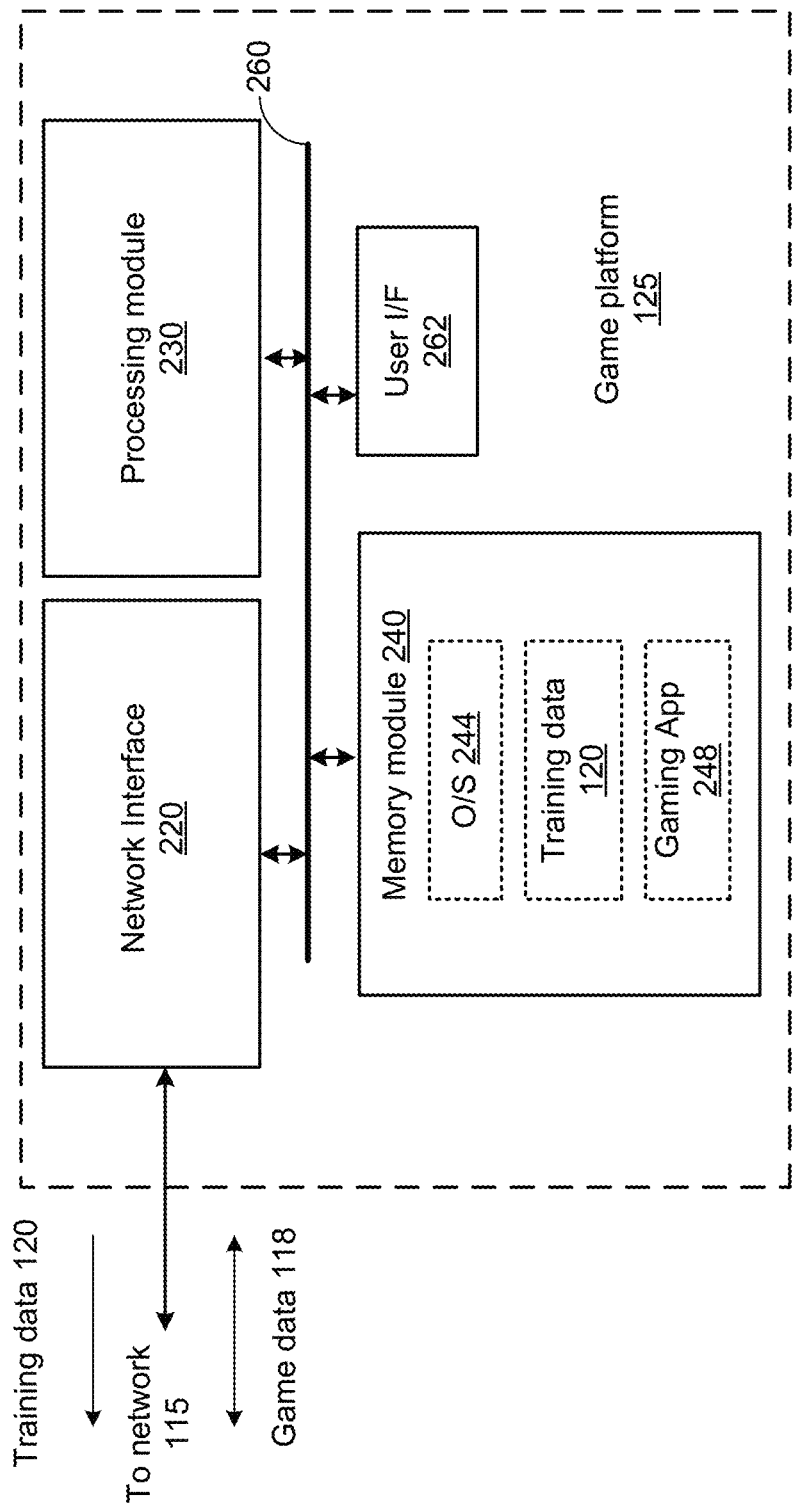
FIG. 2 presents a block diagram representation of a game platform in accordance with an embodiment of the present disclosure.

FIG. 2 presents a block diagram representation of a game platform in accordance with an embodiment of the present disclosure. In particular, the game platform 125 includes a network interface 220 such as a 3G, 4G, 5G or other cellular wireless transceiver, a Bluetooth transceiver, a WiFi transceiver, UltraWideBand transceiver, WIMAX transceiver, ZigBee transceiver or other wireless interface, a Universal Serial Bus (USB) interface, an IEEE 1394 Firewire interface, an Ethernet interface or other wired interface and/or other network card or modem for communicating for communicating via network 115.

The game platform 125 also includes a processing module 230 and memory module 240 that stores an operating system (O/S) 244 such as an Apple, Unix, Linux or Microsoft operating system or other operating system, training data 120, and one or more gaming applications 248. In particular, the O/S 244 and gaming application 248 each include operational instructions that, when executed by the processing module 230, cooperate to configure the processing module into a special purpose device to perform the particular functions of the game platform 125 described herein.

The game platform 125 also includes a user interface (I/F) 262 such as a display device, touch screen, key pad, touch pad, joy stick, thumb wheel, a mouse, one or more buttons, a speaker, a microphone, an accelerometer, gyroscope or other motion or position sensor, video camera or other interface devices that provide information to a user of the game platform 125 and that generate data in response to the user's interaction with the game platform 125.

The processing module 230 can be implemented via a single processing device or a plurality of processing devices. Such processing devices can include a microprocessor, micro-controller, digital signal processor, microcomputer, central processing unit, quantum computing device, field programmable gate array, programmable logic device, state machine, logic circuitry, analog circuitry, digital circuitry, and/or any device that manipulates signals (analog and/or digital) based on operational instructions that are stored in a memory, such as memory 240. The memory module 240 can include a hard disc drive or other disc drive, read-only memory, random access cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is presented that includes a single bus 260, other architectures are possible including additional data buses and/or direct connectivity between one or more elements. Further, the game platform 125 can include one or more additional elements that are not specifically shown.

As previously discussed, the game platform 125 sends and receives, via network interface 220, game data 118 associated with the gaming application 248. The game data 118 can include, for example, a current version of a gaming application 248 that is presented to the gaming devices for play. Furthermore, the game data 118 sent from the gaming devices to the game platform 125 can include game output, including but not limited to the reviewed media content as well as moral score data associated with moral index data that indicates one or more moral indices or factors associated with each instance of the reviewed media content. The reviewed media content can include the specific media content being reviewed, analyzed and/or evaluated and, for example, the associated questions, answers, comments and/or other data generated by users/players. The game data 118 can be sorted, formatted and/or otherwise processed by the processing module 230 to generate the training data 120 to include the reviewed media content and the corresponding moral score data.

In various embodiments, the game platform 125 sends, via network interface 220, the training data 118 to a moral insights platform 130 that generates an AI moral insight model. In other cases, the user/player's gaming device can house their own data and AI on their own systems. For example, users/players can use transfer learning or other machine learning technique on models from the moral insights platform 130 and/or training data 120 or 120' to create their own AI moral insight models.

Although the game platform 125 has been discussed in terms of providing training data 120 for AI applications, it can also be used for entertainment purposes, and also for educational/training purposes to provide, for example, moral dialog and feedback in public, commercial and private educational/training settings to provide moral insights, identify bias, and/or to promote moral conduct etc.

Figure 3A:
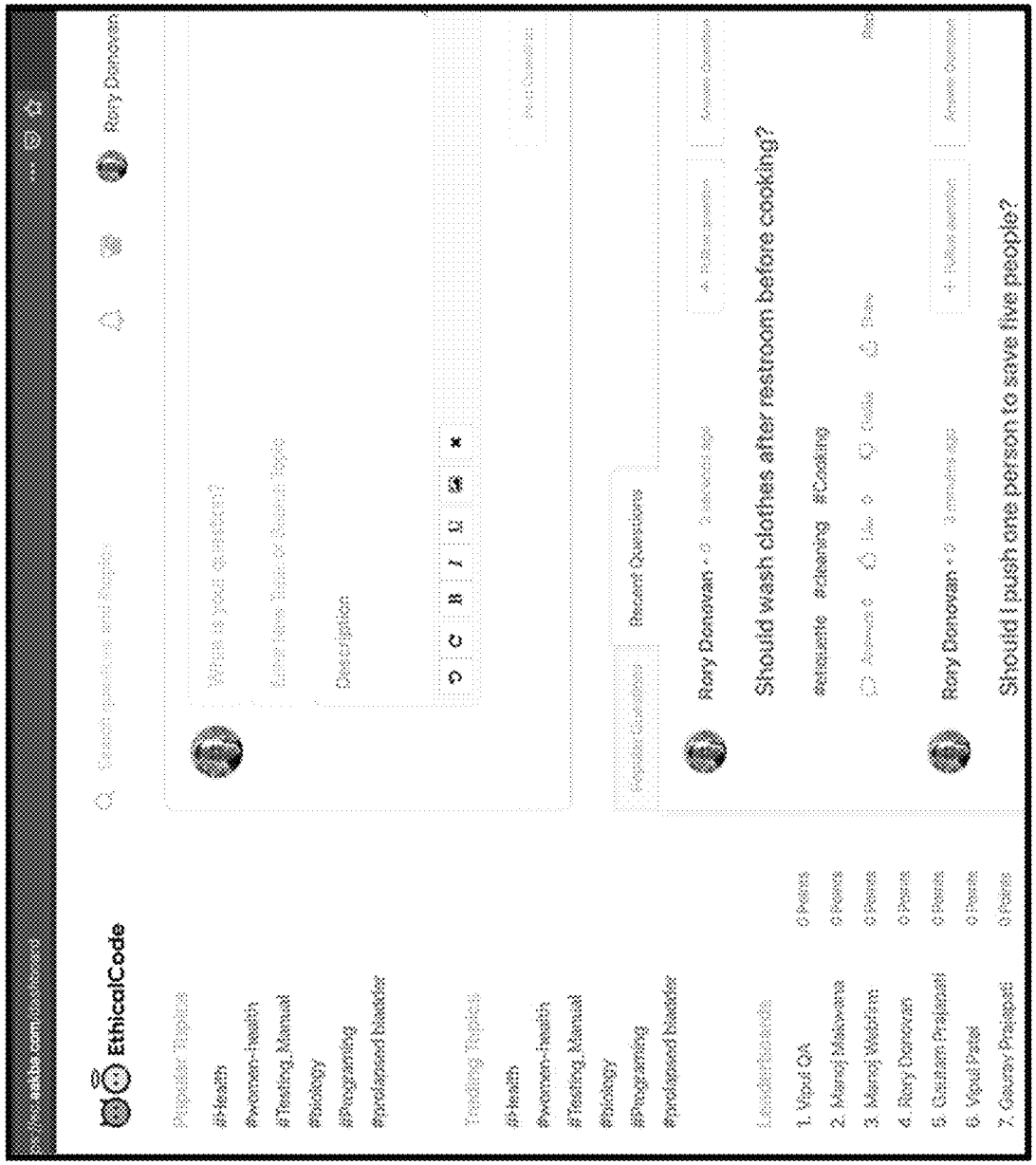
FIG. 3A presents a graphical diagram representation of a screen display in accordance with an embodiment of the present disclosure.

FIGS. 3A-3C present graphical diagram representations 300, 325 and 350 of portions of a screen display in accordance with embodiments of the present disclosure. In particular, screen displays of a gaming application, such as gaming application 248, are presented as part of a graphical user interface that interacts with a player/user. In the example shown in FIG. 3A, the gaming application takes the form of a social media question and answer game where players/users can post questions including text and/or other media for review. Other players/users can provide answers on feed in the form of analysis, comments, and other evaluations that, for example prompt further discussion facilitating arrival at a consensus as to various moral scores associated with the particular content.

Players/users can judge media content along moral subdomains, using sliders for example, to reach consensus as shown in FIG. 3B. In the example shown, an individual score as well as an average score for all participating player/users is presented for each of six different moral indices. The moral indices presented include factors for immoral/moral, betrayal/loyalty, degradation/sanctity, harm/care, cheating/fairness and subversion/authority, however, in other examples, some subset of one or more of these factors could likewise be employed as well as the use of other moral indices not expressly shown. For example, each of the moral indices can represent a scale between two moral opposites, one positive and negative. Numerical scores can range from a positive number indicating a highest amount of a positive moral trait in the pair and a negative number indicating the highest amount of negative moral trait in the pair. In the example shown, the moral score data ranges from 10 to −10 for each of the moral indices. In this fashion, the moral score data can indicate a degree or amount of one moral factor and consequently an amount (or inverse amount) of its opposite moral factor. For example, a moral score of 10 associated with immorality/morality would indicate complete morality, a moral score of −10 would indicate complete immorality, a moral score of 3 would indicate more morality than immorality, a score of −5 would indicate more immorality than morality, and a moral score of 0 would indicate indifference between the two—neither immoral or moral. One or more particular moral indices could be selected by a player/user for evaluation with respect to a particular question that is posed. While a particular numerical representation of moral score data is presented, other scoring schemes using likelihood, probabilities, percentages, normal scores, ranks, and other parametric or non-parametric scores could likewise be employed.

In various embodiments, a determination that consensus has been reached can be determined based on a number of factors such as: a) the number of evaluations of the media content, b) the standard deviation of the moral score data for each of the moral indices, c) a drop off in new comments and evaluations of the media content, d) input from one or more experienced user/players that consensus has been reached, and/or e) input from a systems operator or administrator of the game platform 125 that consensus has been reached.

Once a consensus has been reached, the reviewed media content and the corresponding moral score data can be extracted from the game data 118 to form the training data 120.

Players/users have the opportunity to learn something new and also to earn a reputation by contributing content and participating in the platform. In various embodiments, players/users can earn badges, such as the badge 352 shown in the user profile shown in FIG. 3C, based on factors such as accumulated participation, reaching certain participation goals, based on reviews by other users. Each user receives points for various types of contributions, which for example, can act as proxies for a player/user's reputation. It should be noted that the badge 352 is merely an example and other badge designs could include emojis, pictures, highlighted text, other identifiers and/or any combination thereof.

Certain tasks unlock badges (for a certain amount of time or all the time), which incentives players/users to maintain an active level of contribution. Badges can be permanent, temporary and based on performance during a predetermined time period or window, and/or associated with a particular event such as a tourney of fixed duration. In particular, temporary and tournament badges can be used to encourage new participation with the game. Furthermore, the badges, such as badge 352 can provide a rewarding player/user experience and also provide a mechanism for more advanced players/users to differentiate themselves.

In addition to the provision for badges, a user's profile can be highly customizable with pictures, interests, demographic data such as religion, current geographic location, place of birth, schools and colleges, profession, income level, age, and/or other demographics.

In various embodiments, administrators/operators of the gaming platform 125 can identify adherent, disruptive and/or trolling behavior based on player/user behavior and take action to warn or prohibit offending players/users. Furthermore, a player/user's history of biased conduct to others based on their socioeconomic status, location, gender, ethnicity or other demographics, can be identified. For example, a history of objectionable conduct that is identified by trends and reporting behavior (e.g., a verified report threshold of 3) can lead to banning and inability judge, ask questions and/or provide answer, comments, report other users, etc. In addition, one or more AI tools can be trained to and used to automatically identify such adherent, disruptive and/or trolling behavior and to automatically take action to warn or prohibit offending players/users.

Figure 4:
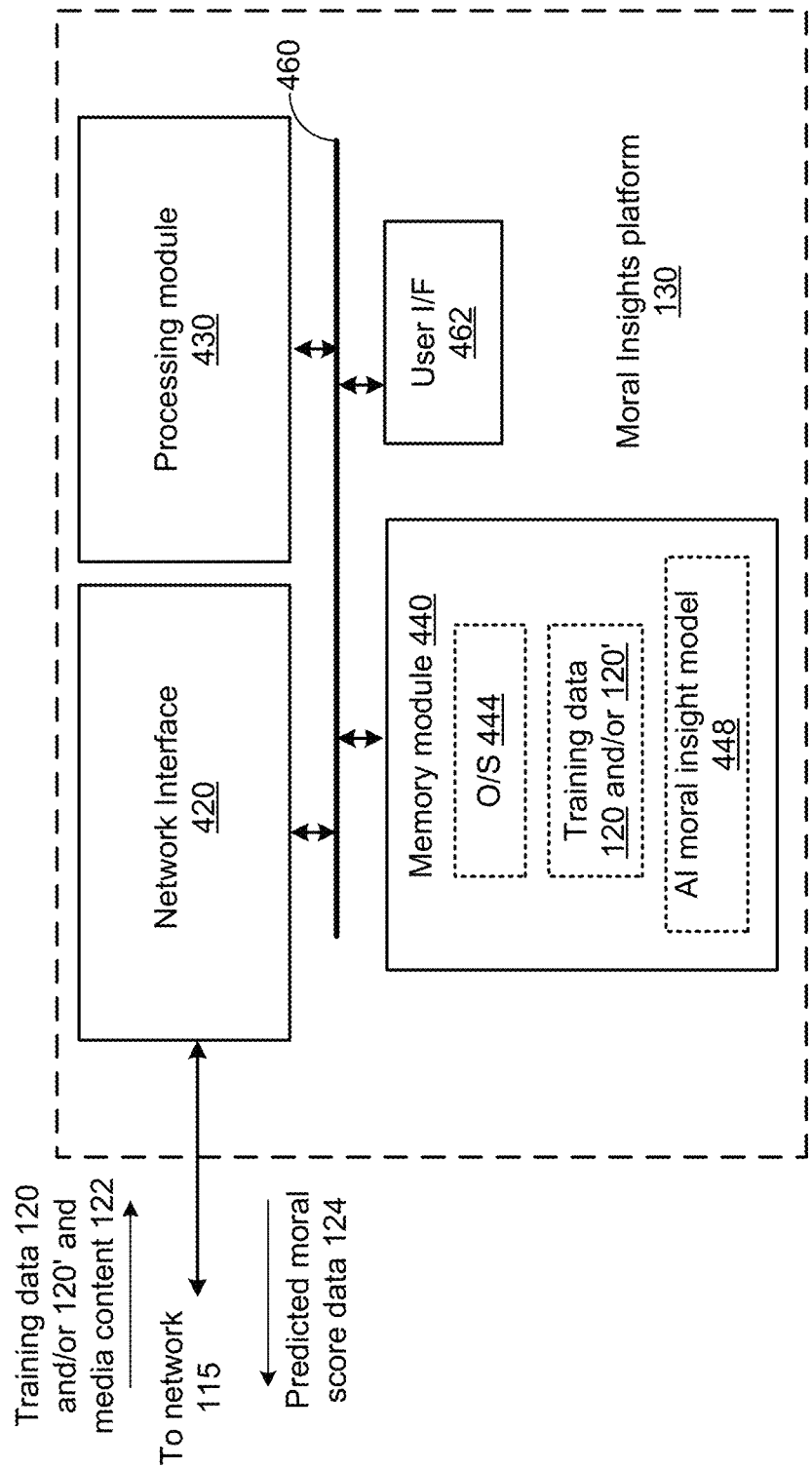
FIG. 4 presents a block diagram representation of a moral insights platform in accordance with an embodiment of the present disclosure.

FIG. 4 presents a block diagram representation of a moral insights platform 130 in accordance with an embodiment of the present disclosure. In particular, the moral insights platform 130 includes a network interface 420 such as a 3G, 4G, 5G or other cellular wireless transceiver, a Bluetooth transceiver, a WiFi transceiver, UltraWideBand transceiver, WIMAX transceiver, ZigBee transceiver or other wireless interface, a Universal Serial Bus (USB) interface, an IEEE 1394 Firewire interface, an Ethernet interface or other wired interface and/or other network card or modem for communicating for communicating via network 115.

The moral insights platform 130 also includes a processing module 430 and memory module 440 that stores an operating system (O/S) 444 such as an Apple, Unix, Linux or Microsoft operating system or other operating system, training data 120 and/or 120', and an AI moral insights model 448. In particular, the O/S 444 and AI moral insights model 448 each include operational instructions that, when executed by the processing module 430, cooperate to configure the processing module into a special purpose device to perform the particular functions of the moral insights platform 130 described herein.

The moral insights platform 130 also includes a user interface (I/F) 462 such as a display device, touch screen, key pad, touch pad, joy stick, thumb wheel, a mouse, one or more buttons, a speaker, a microphone, an accelerometer, gyroscope or other motion or position sensor, video camera or other interface devices that provide information to a user of the moral insights platform 130 and that generate data in response to the user's interaction with moral insights platform 130.

The processing module 430 can be implemented via a single processing device or a plurality of processing devices. Such processing devices can include a microprocessor, micro-controller, digital signal processor, microcomputer, central processing unit, quantum computing device, field programmable gate array, programmable logic device, state machine, logic circuitry, analog circuitry, digital circuitry, and/or any device that manipulates signals (analog and/or digital) based on operational instructions that are stored in a memory, such as memory 440. The memory module 440 can include a hard disc drive or other disc drive, read-only memory, random access cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is presented that includes a single bus 460, other architectures are possible including additional data buses and/or direct connectivity between one or more elements. Further, the moral insights platform 130 can include one or more additional elements that are not specifically shown.

In various embodiments, the AI moral insights model 448 operates via a machine learning algorithm that is trained via the training data 120 and/or 120' received via network interface 420. Examples of such machine learning algorithms include artificial neural networks (or more simply "neural networks" as used herein), support vector machines, Bayesian networks, genetic algorithms and/or other machine learning techniques that are trained via deep, unsupervised, semi-supervised, supervised and/or reinforcement learning and can further include feature learning, sparse dictionary learning, anomaly detection, decision trees, association rules, clustering techniques such as k-means clustering and/or other AI procedures and processes.

Once the moral insights platform 130 generates the AI moral insight model 448, the moral insights platform 130 receives, via network interface 420, new media content 122 from a media source for evaluation by the model. The moral insights platform 130 utilizes the AI moral insight model 448 to generate predicted moral score data 124 associated with the new media content 122 corresponding to one or more moral indices. These moral indices can include, for example, factors for immoral/moral, betrayal/loyalty, degradation/sanctity, harm/care, cheating/fairness and subversion/authority, however, in other examples, some subset of one or more of these factors could likewise be employed as well as the use of other moral indices. In addition, to the scores associated with each of the moral indices, the AI moral insight model 448 can also generate a confidence score that indicates, for example, a level of confidence associated with either the predicted score for each of the moral indices and/or an overall confidence associated with the predictions(s). This predicted moral score data 124 is sent, via network interface 420, to the media source 140 and can be compared with one or more moral index threshold, for example, to block content with that compares unfavorably to such threshold(s) and/or to validate, certify or allow content that compares favorably to such threshold(s).

Figure 5:
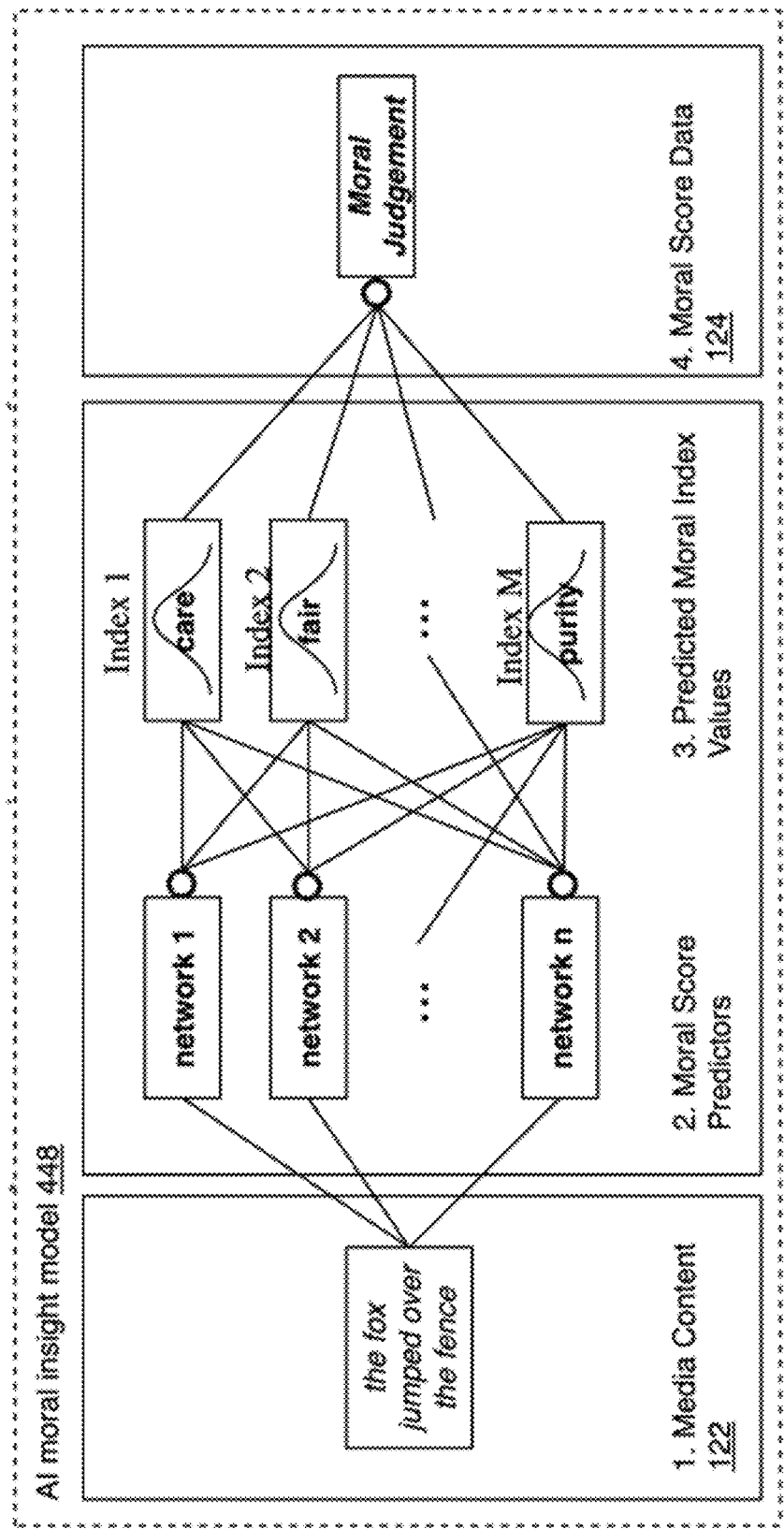
FIG. 5 presents a graphical representation of an AI moral insights model in accordance with an embodiment of the present disclosure.

FIG. 5 presents a graphical representation of an AI moral insight model in accordance with an embodiment of the present disclosure. In particular, an example of an AI moral insight model 448 is shown that processes example media content 122 to generate predicted moral score data 124. In the first section, the media content 122 is encoded for processing. In the second section, n-artificial neural networks generate moral score predictors. In the third section, the individual moral score predictors are processed to generate predicted moral index values, also corresponding to the m different moral indices. In the fourth section, predicted moral score data 124 is generated to include the n individual predicted moral index values, a weighted combination or other function of the m individual predicted moral index values, comparison results that indicate whether each of the individual predicted moral index values compare favorably or unfavorably to a corresponding threshold, comparison results that indicate whether some weighted combination or other function of the individual predicted moral index values compares favorably or unfavorably to a threshold, another function of the predicted moral index values, one or more confidence scores corresponding to the predicted moral index values, other processing including detailed analyses (for example, to present a report with plots or natural language produced by machines, on demographics).

While a particular example of the AI moral insight model 448 is shown, other neural network, machine learning and AI models can likewise be employed. In various embodiments, layer 3 generates numerical index values (e.g. —care is—23/100). Layer 2 can include neural network units containing neural network models, support vector machines, Bayesian learning models, etc. Thus, the output from the networks from layer 2 may be index values themselves or something else (for example embeddings) that can help generate the index values in layer 3. Differing AI models can be employed in layer 2, (e.g. network 1 is Bayesian, network 2 is a support vector machine, or have all of them be the same (e.g. networks 1, 2, 3, . . . n are all artificial neural networks). Combining the network results as an ensemble in the interconnection mesh shown can produce, for example, statistics used in layer 3. The values of n and m can be the same or different.

Furthermore, AI moral insight model 448 can include multiple AI moral insight models corresponding to differing demographics. Consider the question, is it ethical to eat a hamburger? Differing moral views could be associated with someone that observes a paleo diet as opposed to a vegan diet. Multiple AI moral insight models can be used to isolate differing moral views and further to generate differing predictions, based on, for example, region, habits, culture, age, religion, etc.

Figure 6:
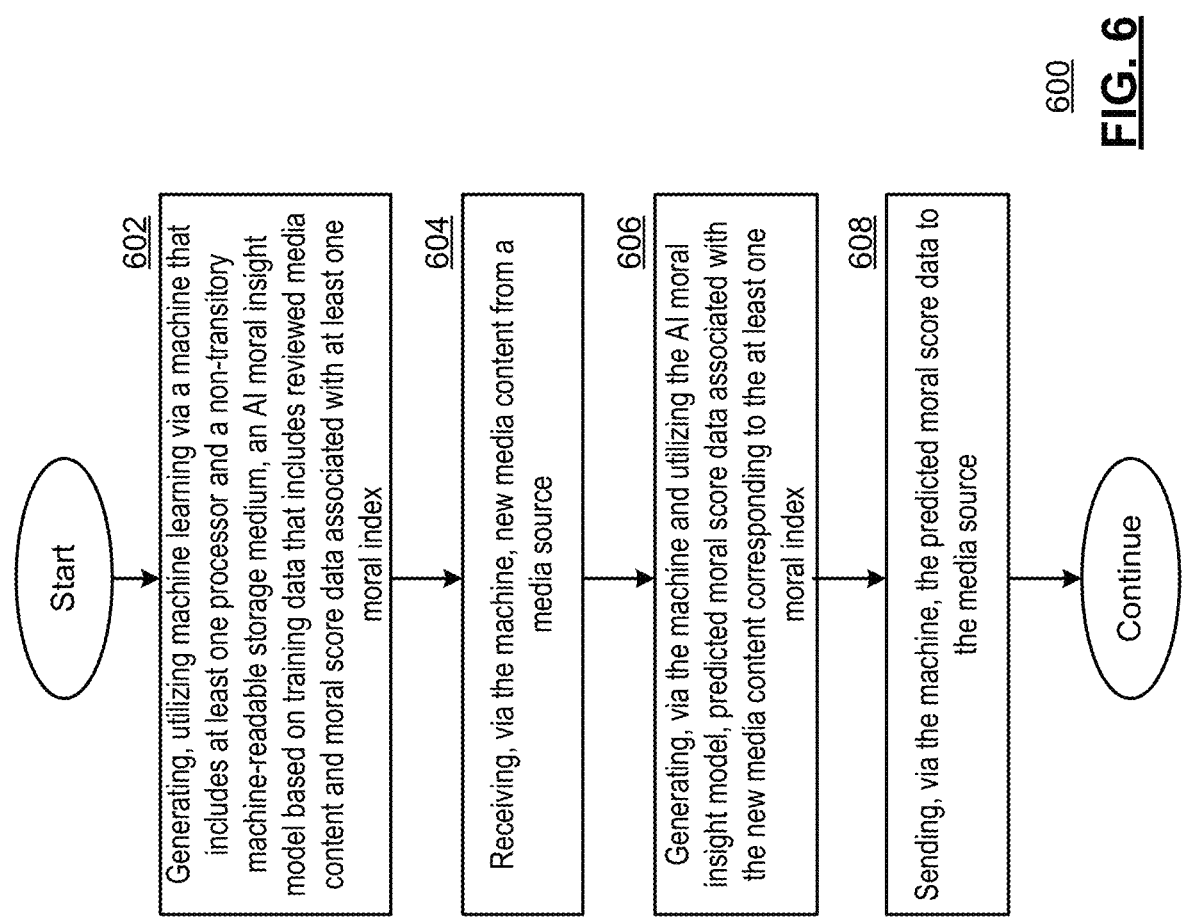
FIG. 6 presents a flowchart representation of a method in accordance with an embodiment of the present disclosure.

FIG. 6 presents a flowchart representation 600 of a method in accordance with an embodiment of the present disclosure. In particular, a method is presented for use with any of the functions and features discussed in conjunction with FIG. 1-5.

Step 602 includes generating, utilizing machine learning via a machine that includes at least one processor and a non-transitory machine-readable storage medium, an AI moral insight model based on training data, wherein the training data includes reviewed media content and moral score data associated with at least one moral index. Step 604 includes receiving, via the machine, new media content from a media source. Step 606 includes generating, via the machine and utilizing the AI moral insight model, predicted moral score data associated with the new media content corresponding to the at least one moral index. Step 608 includes sending, via the machine, the predicted moral score data to the media source.

In various embodiments, the moral score data associated with the at least one moral index indicates a degree of immorality/morality, a degree betrayal/loyalty, a degree of degradation/sanctity, a degree of harm/care, a degree of cheating/fairness and/or a degree of subversion/authority. The at least one moral index can represent a scale between a pair of moral opposites.

In various embodiments, the at least one moral index includes a plurality of moral indices and the AI moral insight model includes a plurality of artificial neural networks that generate a plurality of predicted moral index values, wherein each of the plurality of predicted moral index values corresponds to one of the plurality of moral indices. The moral score data can be generated based on the plurality of predicted moral index values.

In various embodiments, the method further includes: receiving, via a system, game data associated with a gaming application; generating, via the system and based on the game data, the training data that includes the reviewed media content and the moral score data associated with the at least one moral index; and sending, via the system, the training data to the moral insights platform to facilitate training of the AI moral insight model. The gaming application can present a graphical user interface that displays instances of the reviewed media content and facilitates generation of the moral score data associated with the at least one moral index based on interaction of a player with the gaming application.

Figure 7:
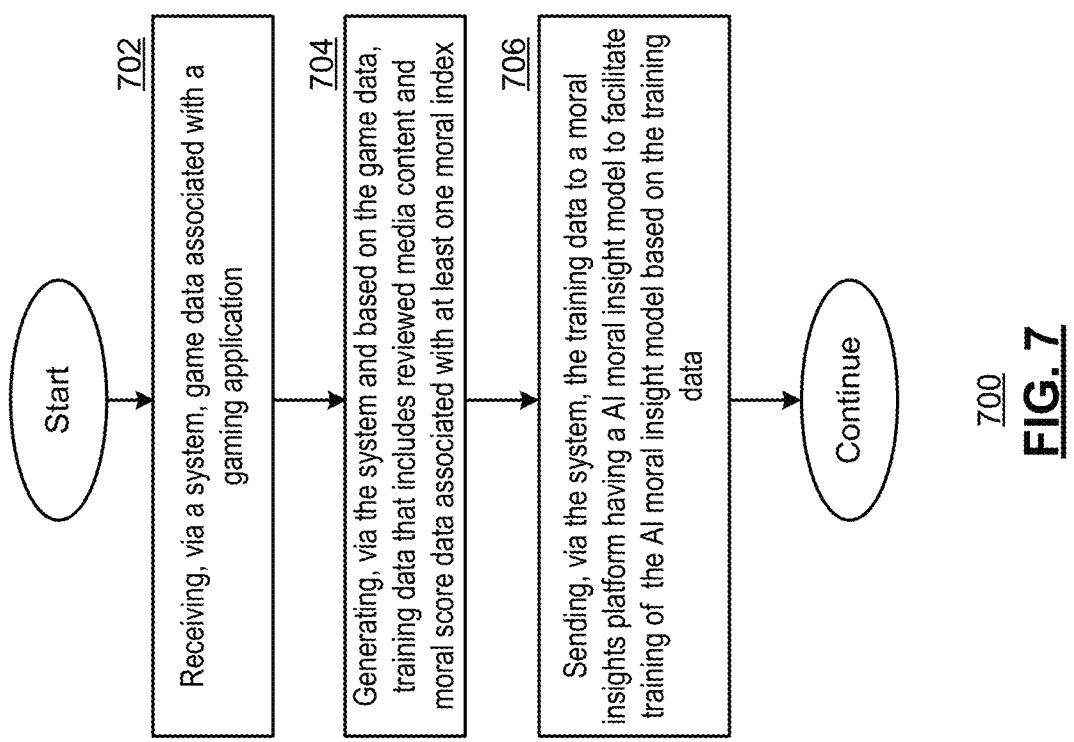
FIG. 7 presents a flowchart representation of a method in accordance with an embodiment of the present disclosure.

FIG. 7 presents a flowchart representation 700 of a method in accordance with an embodiment of the present disclosure. In particular, a method is presented for use with any of the functions and features discussed in conjunction with FIG. 1-6.

Step 702 includes receiving, via a system that includes a processor, game data associated with a gaming application. Step 704 includes generating, via the system and based on the game data, training data that includes reviewed media content and moral score data associated with at least one moral index. Step 706 includes sending, via the system, the training data to a moral insights platform having an AI moral insight model to facilitate training of the AI moral insight model based on the training data.

Figure 8A:
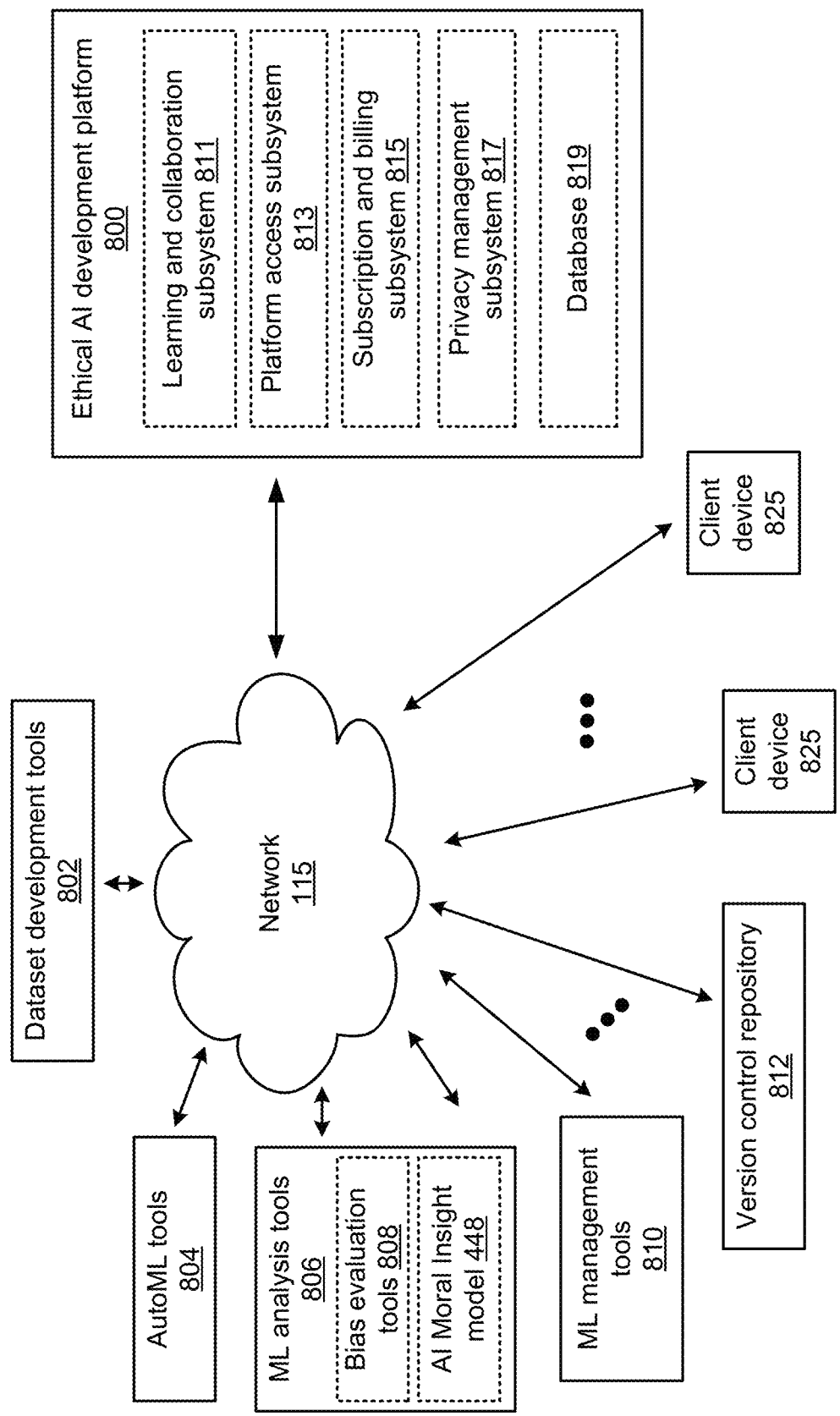
FIG. 8A presents a block diagram representation of a system in accordance with an embodiment of the present disclosure.

FIG. 8A presents a block diagram representation of a system 850 in accordance with an embodiment of the present disclosure. As AI development accelerates at an unprecedented rate, many ML Engineers are beginning to require knowledge in a diverse range of fields including AI ethics, MLOps, and AutoML. Currently there is just scattered, disparate toolkits, which can lead developers to make poor decisions due to lack of experience and accountability.

There is also increased regulation requirements under way by places like the EU and potential need to meet some standards of quality in the near future. IBM has Fairness 360 for bias. IBM also has the Explainability Toolkit for increasing transparency. There is Audit-AI for statistical bias detection. Lime has software for visualizing bias to increase fairness. There is SHAP that uses game theory for explain output of black box model. There is XAI for dynamic systems. The problem is that most AI developers do not want to switch from one platform or toolkit, to another, and another again. The ethical AI development platform 800 and system 850 makes these technological improvements by reworking the AI infrastructure from the ground up, building AI ethics into the work experience, and streamlining the process to achieve safe and effective algorithms for Ethical ML developers. It provides a "one stop shop" to building robust and certifiable AI systems. Although the primary goal of the ethical AI development platform 800 is to provide a software as a service (SaaS) platform to an ethical AI community, it may be used in conjunction with a social media platforms such as Instagram, Facebook, LinkedIn, GitHub, etc. This platform could also be used by AI ethicists to audit their own systems of AI development. Users can use the framework and publicly post their decisions along the way for feedback from community through the posting of problems, questions, etc.

The ethical AI development platform 800 includes:
a. a platform access subsystem 813 that provides secure access to the ethical AI development platform to a plurality of client devices 825 via network 115;
b. a learning and collaboration subsystem 811 that provides a network-based forum that facilitates a collaborative development of machine learning models or other AI tools via the plurality of client devices and that provides access to a library of AI tutorials, a database of AI news, a forum for questions and answers regarding machine learning, including the use of specific machine learning techniques and/or whether or not particular process is fair, biased, transparent, secure, safe, etc., and/or a database of documentation regarding the ethical AI development platform 800 including, for example, instructions on what the platform is, why it is, what is in it, who it is for, when to use it, and how to use it and further including instructions on the use of the various subsystems, and/or how to access and operate the various interconnected tools via the ethical AI development platform 800;
c. a subscription and billing subsystem 815 that controls access to the ethical AI development platform 800 via each of the plurality of client devices 825 in conjunction with subscription information associated with each of the plurality of client devices 825 and further, that generates billing information associated with each of the plurality of client devices 825 in accordance with the subscription information; and
d. a privacy management system 817 that protects the privacy of machine learning development data associated with each of the plurality of client devices 825.

In operation, the ethical AI development platform 800 facilitates the development of a training dataset associated with at least one of the plurality of client devices 825 that is stored, for example, in a database 819 associated with the ethical AI development platform 800. The ethical AI development platform 800 provides access to the dataset development tools 802 to further assist in this regard. The ethical AI development platform 800 also provides access to a plurality of auto machine learning tools 804, such as DataRobot, H20.ai and/or other auto machine learning tools to facilitate the development of an AI model.

The ethical AI development platform 800 also provides access to a plurality of machine learning analysis tools 806 to facilitate the evaluation of the AI model, wherein the plurality of machine learning analysis tools include at least one bias evaluation tool 808 that predicts a bias associated with the AI model and at least one AI moral insight model 448 that generates predicted moral score data associated with the AI model including one or more of the functions and features previously described and/or other bias or moral insights tool. The ethical AI development platform 800 also provides access to a version control repository 812, such as a Git repository or other version control system for storing and managing a plurality of versions of the training dataset and the AI model. The ethical AI development platform 800 also provides access to one or more machine learning management tools 810 to perform other management operations associated with the AI model, training dataset, etc.

It should be noted that while the learning and collaboration subsystem 811, the platform access subsystem 813, subscription and billing subsystem 815, the privacy management system 817 and the database 819 are shown as internal to the ethical AI development platform 800, and further, the dataset development tools 802, AutoML tools 804, ML analysis tools 806, ML management tools 810 and the version control repository 812 are shown as being external to the ethical AI development platform 800, in other examples, each of these various elements can be implemented either external or internal to the ethical AI development platform 800. Furthermore, the ethical AI development platform 800 can be implemented in a cloud computing configuration with the learning and collaboration subsystem 811, the platform access subsystem 813, subscription and billing subsystem 815, the privacy management system 817, the database 819, the dataset development tools 802, AutoML tools 804, ML analysis tools 806, ML management tools 810 and/or the version control repository 812 implemented within the cloud.

As used herein the terms "tool" and "toolkit" correspond to a website, utility, platform, and/or software routine that performs one or more specific functions.

Figure 8B:
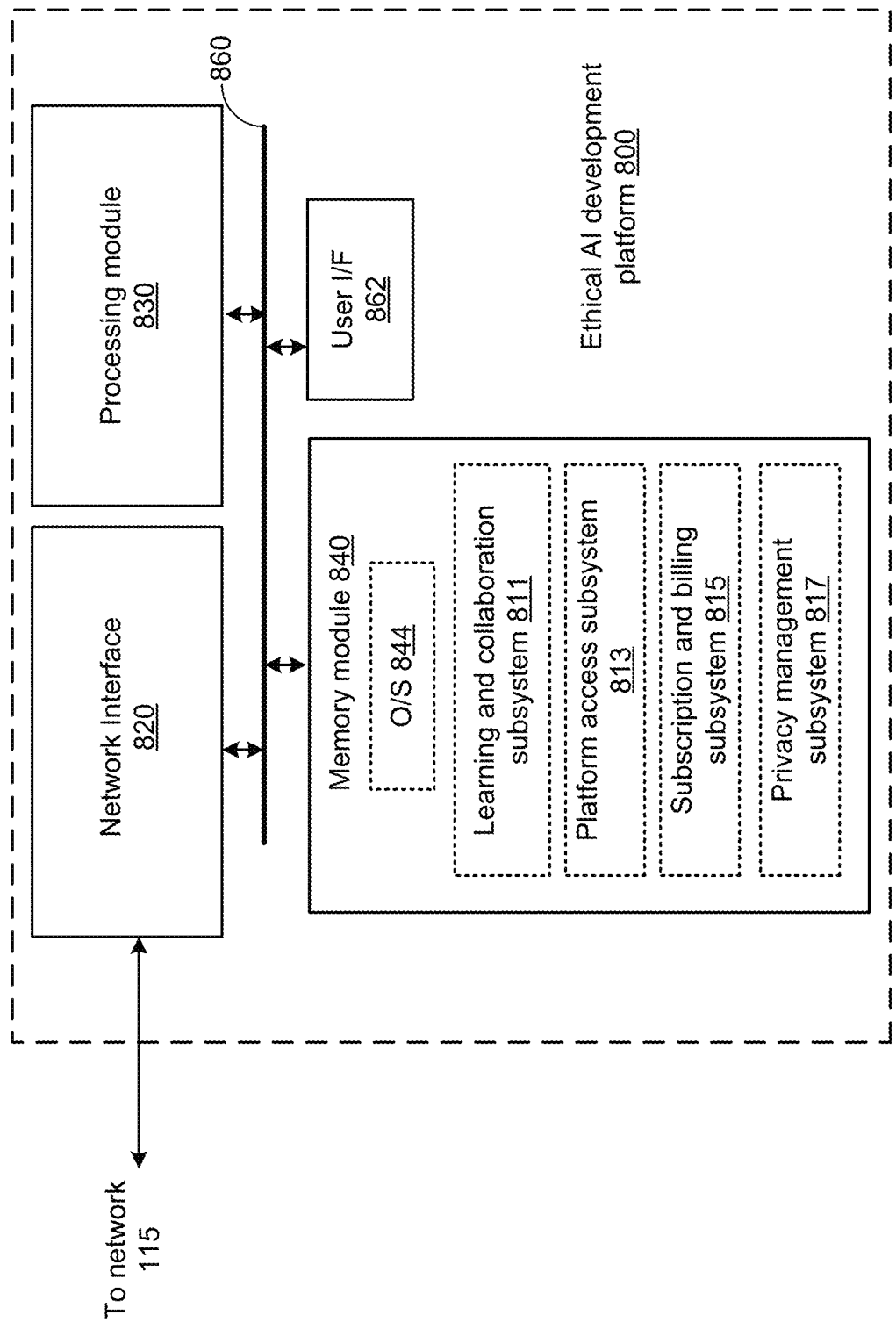
FIG. 8B presents a block diagram representation of an ethical AI development platform in accordance with an embodiment of the present disclosure.

FIG. 8B presents a block diagram representation of an ethical AI development platform 800 in accordance with an embodiment of the present disclosure. In particular, the ethical AI development platform 800 includes a network interface 820 such as a 3G, 4G, 5G or other cellular wireless transceiver, a Bluetooth transceiver, a WiFi transceiver, UltraWideBand transceiver, WIMAX transceiver, ZigBee transceiver or other wireless interface, a Universal Serial Bus (USB) interface, an IEEE 1394 Firewire interface, an Ethernet interface or other wired interface and/or other network card or modem for communicating for communicating via network 115.

The ethical AI development platform 800 also includes a processing module 830 and memory module 840 that stores an operating system (O/S) 844 such as an Apple, Unix, Linux or Microsoft operating system or other operating system, the learning and collaboration subsystem 811, the platform access subsystem 813, subscription and billing subsystem 815, the privacy management system 817 and the database 819. In particular, the O/S 444 the learning and collaboration subsystem 811, the platform access subsystem 813, subscription and billing subsystem 815, the privacy management system 817 and the database 819 each include operational instructions that, when executed by the processing module 830, cooperate to configure the processing module into a special purpose device to perform the particular functions of the ethical AI development platform 800 described herein.

The ethical AI development platform 800 also includes a user interface (I/F) 862 such as a display device, touch screen, key pad, touch pad, joy stick, thumb wheel, a mouse, one or more buttons, a speaker, a microphone, an accelerometer, gyroscope or other motion or position sensor, video camera or other interface devices that provide information to a user of the ethical AI development platform 800 and that generate data in response to the user's interaction with ethical AI development platform 800.

The processing module 830 can be implemented via a single processing device or a plurality of processing devices. Such processing devices can include a microprocessor, micro-controller, digital signal processor, microcomputer, central processing unit, quantum computing device, field programmable gate array, programmable logic device, state machine, logic circuitry, analog circuitry, digital circuitry, and/or any device that manipulates signals (analog and/or digital) based on operational instructions that are stored in a memory, such as memory 840. The memory module 840 can include a hard disc drive or other disc drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is presented that includes a single bus 860, other architectures are possible including additional data buses and/or direct connectivity between one or more elements. Further, the ethical AI development platform 800 can include one or more additional elements that are not specifically shown.

Figure 9:
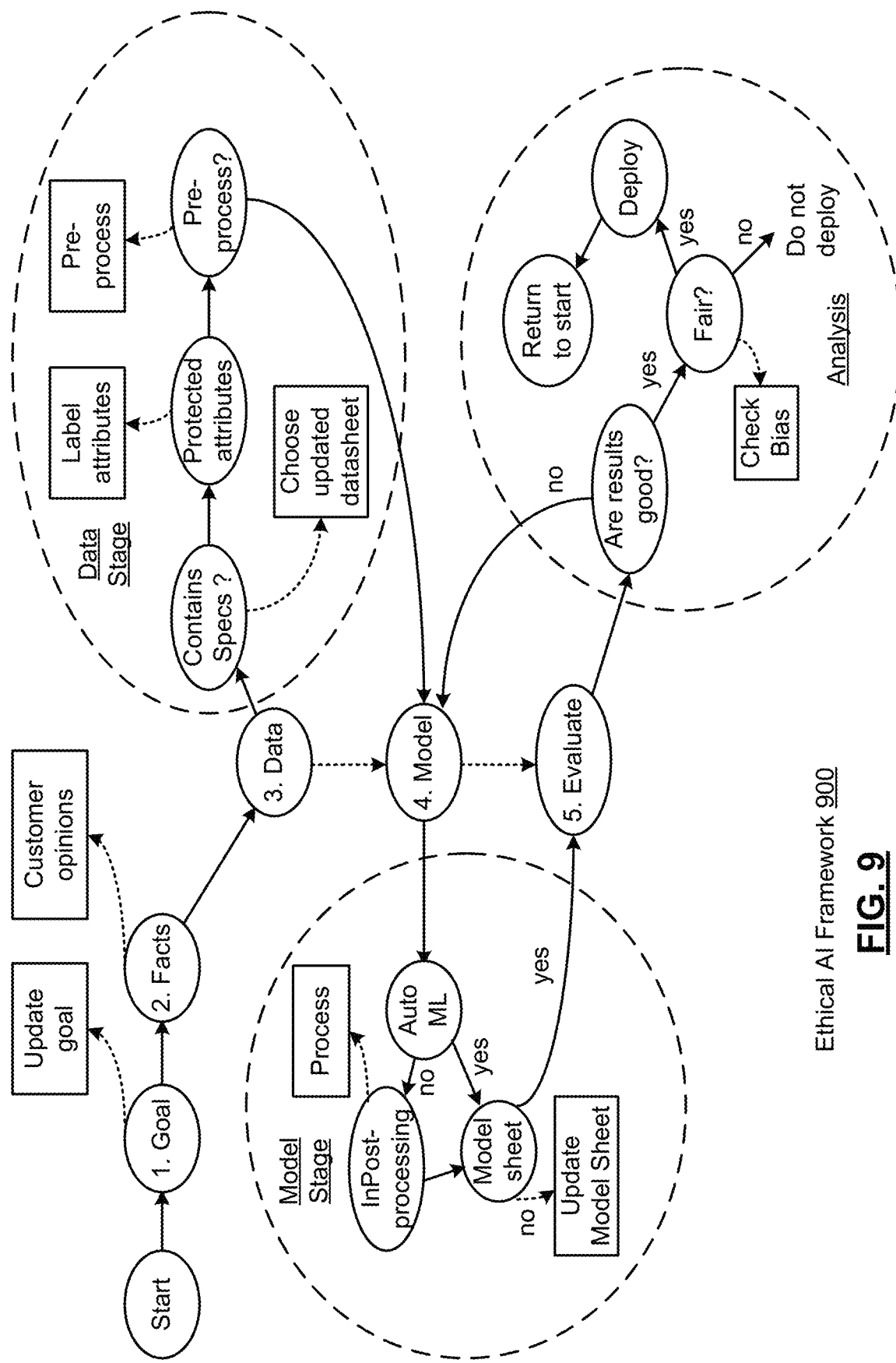
FIG. 9 presents a flowchart representation of a method in accordance with an embodiment of the present disclosure.

FIG. 9 presents a flowchart representation of a method in accordance with an embodiment of the present disclosure. In particular, a development framework is presented for use in conjunction with an ethical AI development platform, such as the ethical AI development platform 800. The development framework facilitates approve/disapprove at each step and feedback from the community/team (on a public or private basis), write up of system values and intended outcome, collection of necessary information to make decisions, dataset selection (with collection procedures and reasons), model selection, generation and testing.

In various embodiments, an application programming interface (API)/user experience (UX) walks an AI developer through the process shown, from a) generating project goals and gathering underlying facts and stakeholder opinions, to b) generating, in the data stage, a datasheet, including, for example, a training database, to c) generating, in the model state, a model sheet for an AI model, and d) analyzing, in the analysis stage, the AI model to determine if it yields acceptable results, is fair (i.e. is unbiased and generates content, for example, with predicted moral score data that is favorable). If so, the AI model is ready for deployment and/or certification as an ethical AI model.

Figure 10:
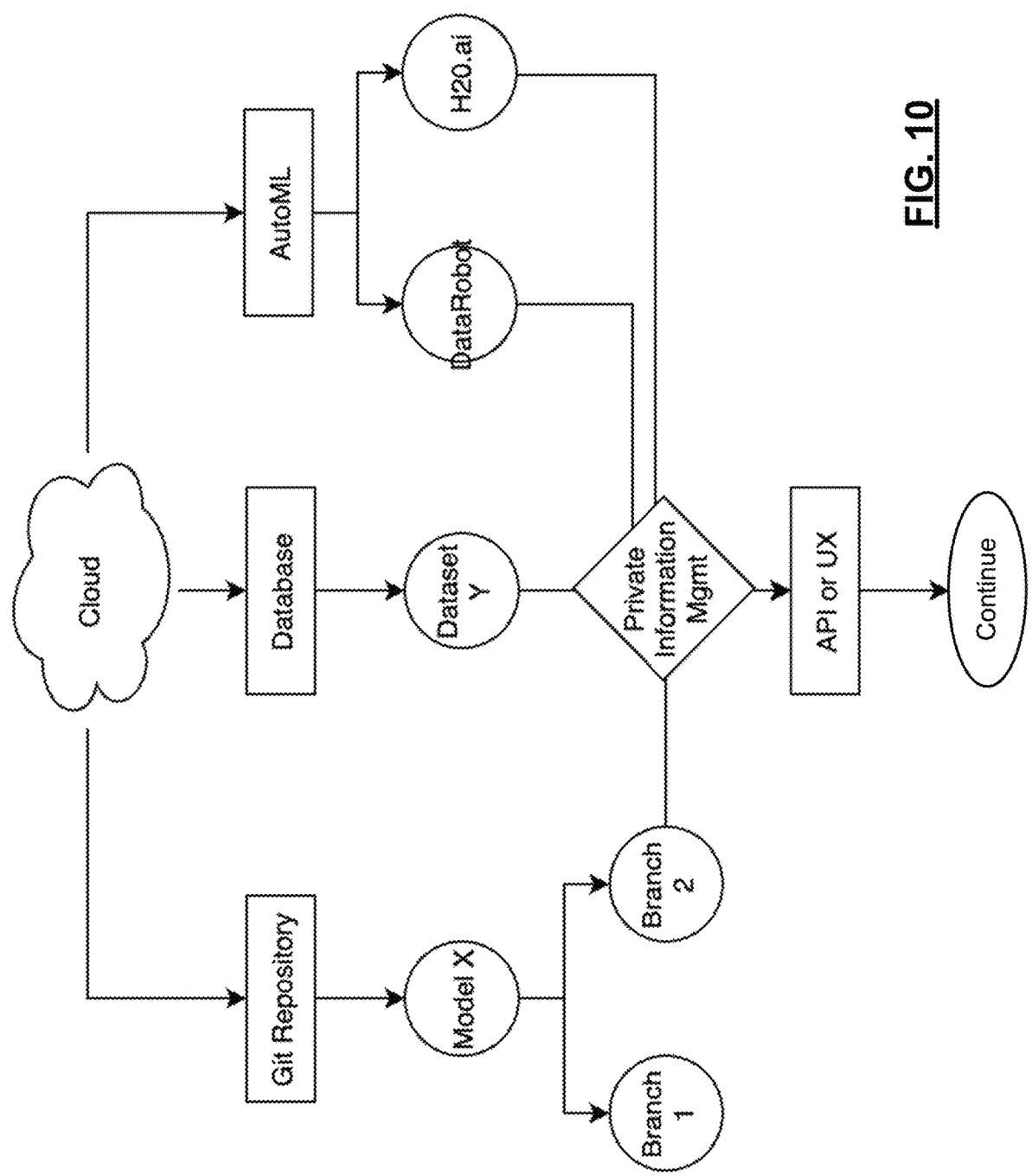
FIG. 10 presents a flow representation in accordance with an embodiment of the present disclosure.
Figure 11A:
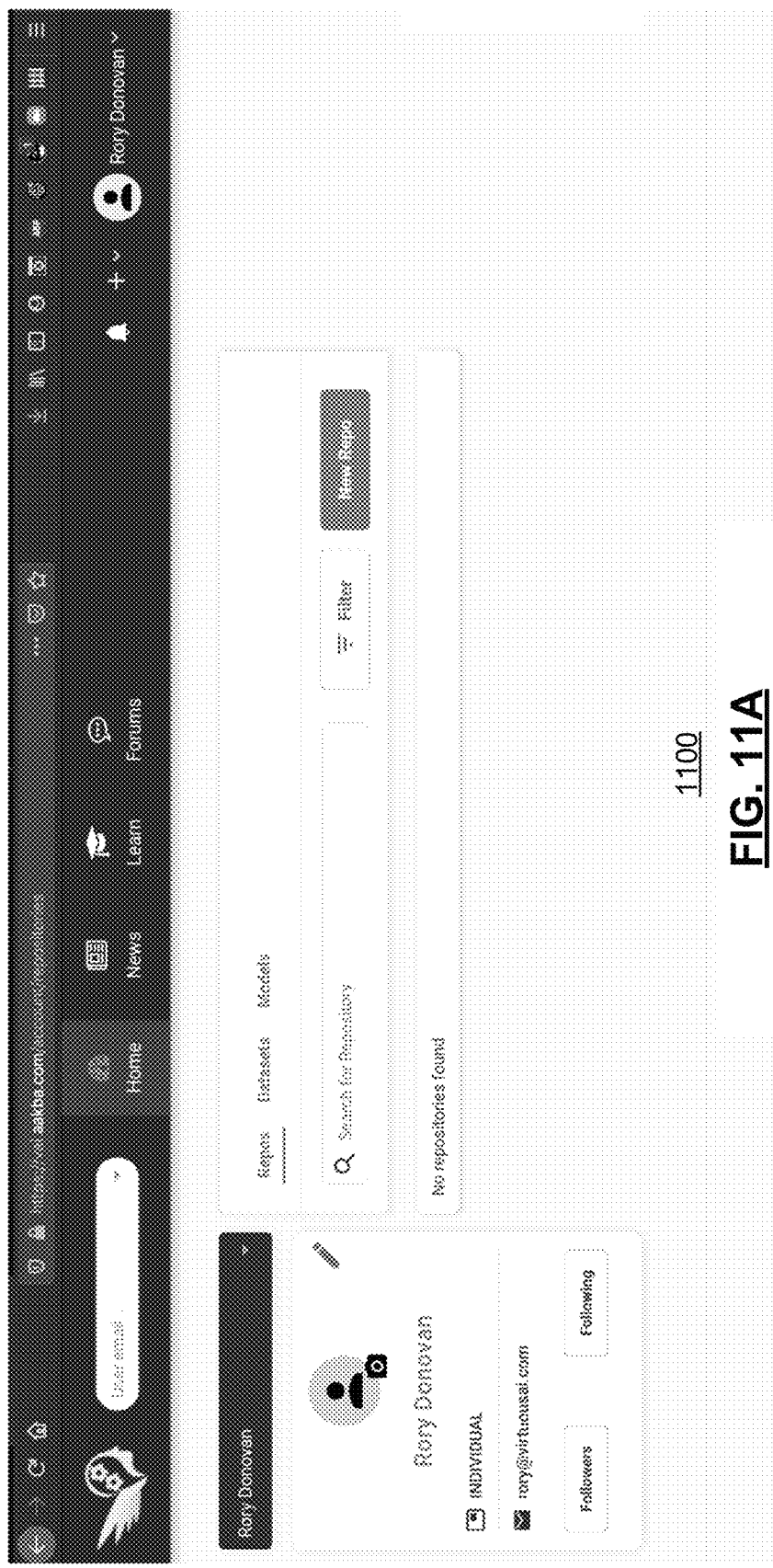
FIG. 11A presents a graphical diagram representation of a portion of a screen display in accordance with an embodiment of the present disclosure.
Figure 11B:
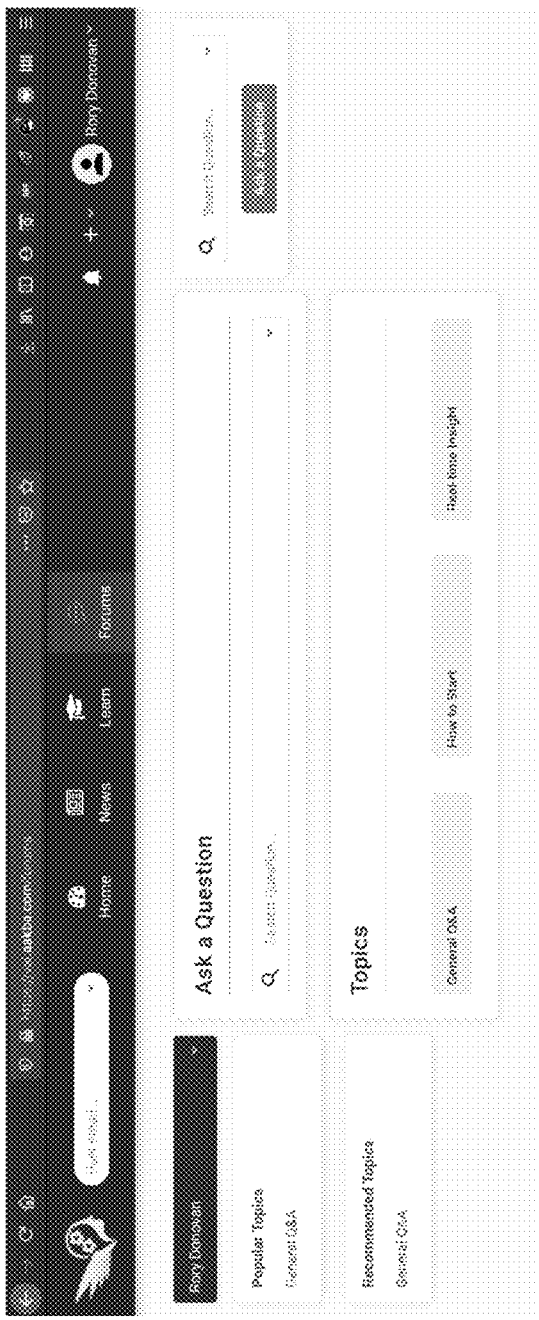
FIG. 11B presents a graphical diagram representation of a portion of a screen display in accordance with an embodiment of the present disclosure.
Figure 11C:
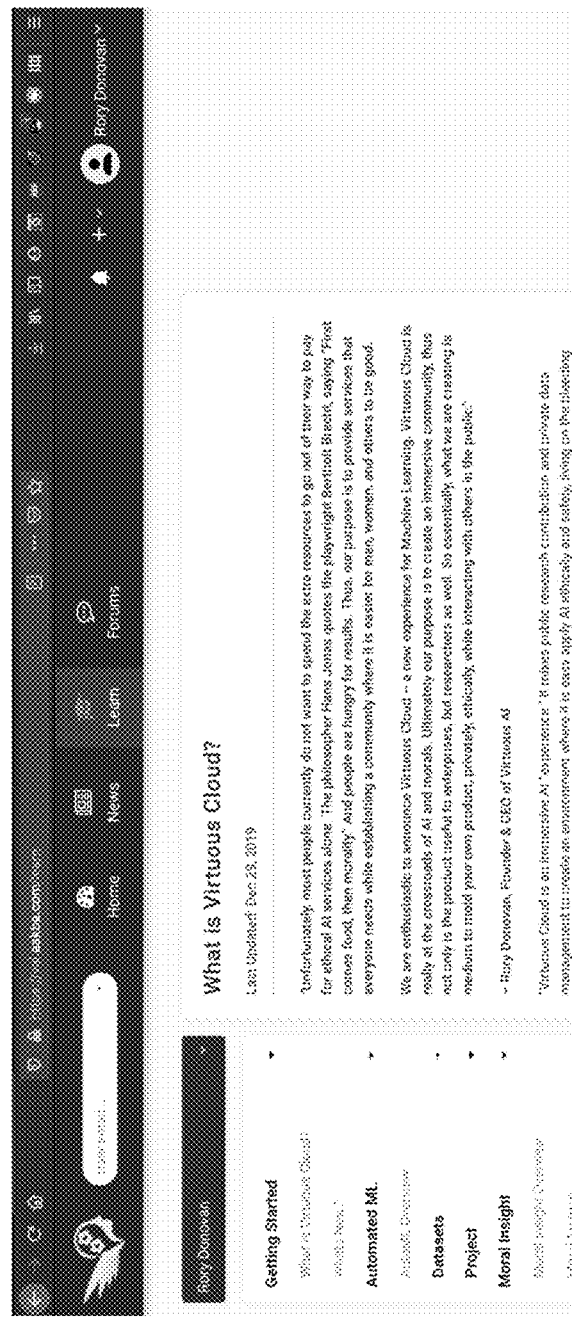
FIG. 11C presents a graphical diagram representation of a portion of a screen display in accordance with an embodiment of the present disclosure.
Figure 11D:
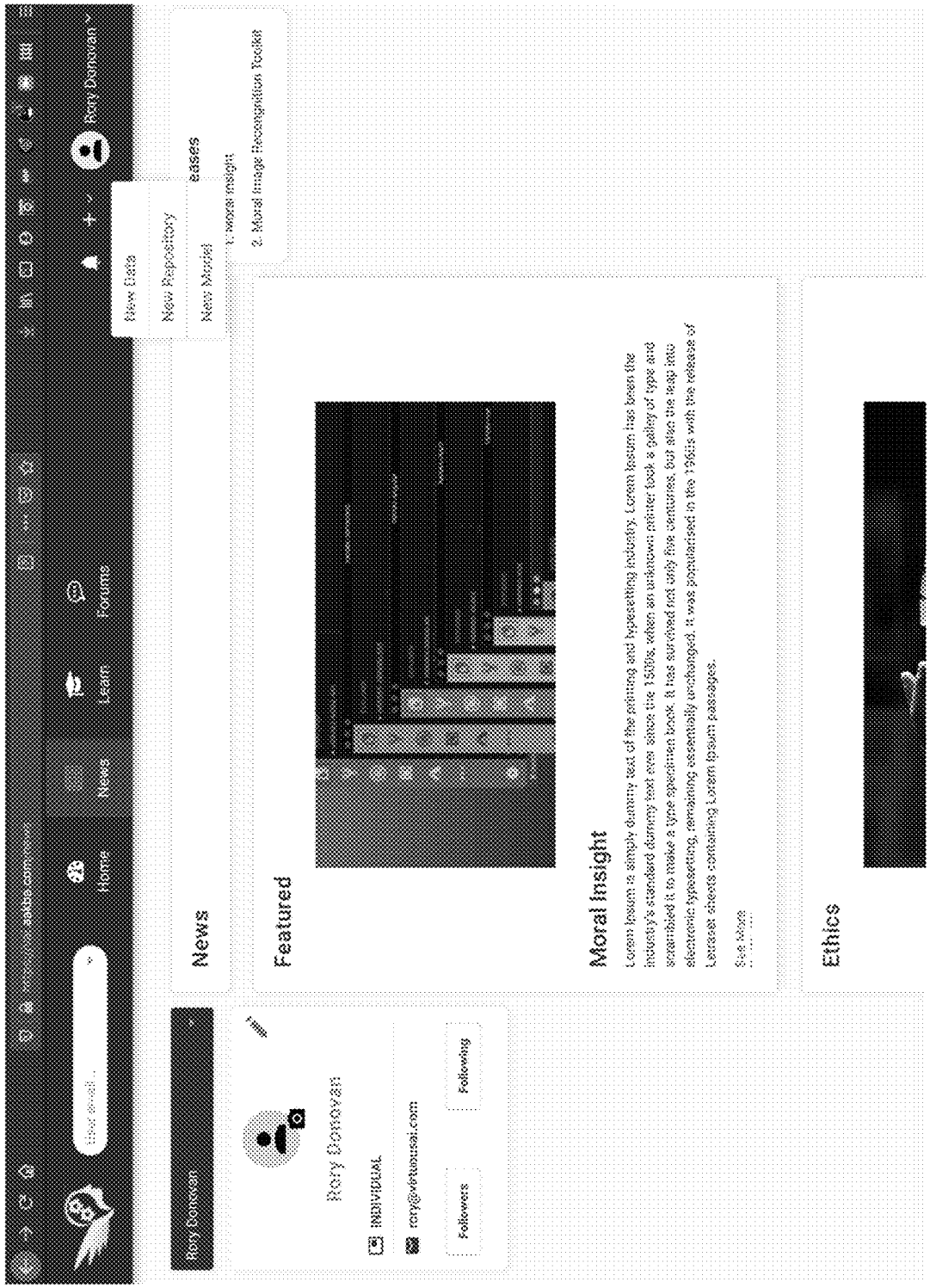
FIG. 11D presents a graphical diagram representation of a portion of a screen display in accordance with an embodiment of the present disclosure.
Figure 11E:
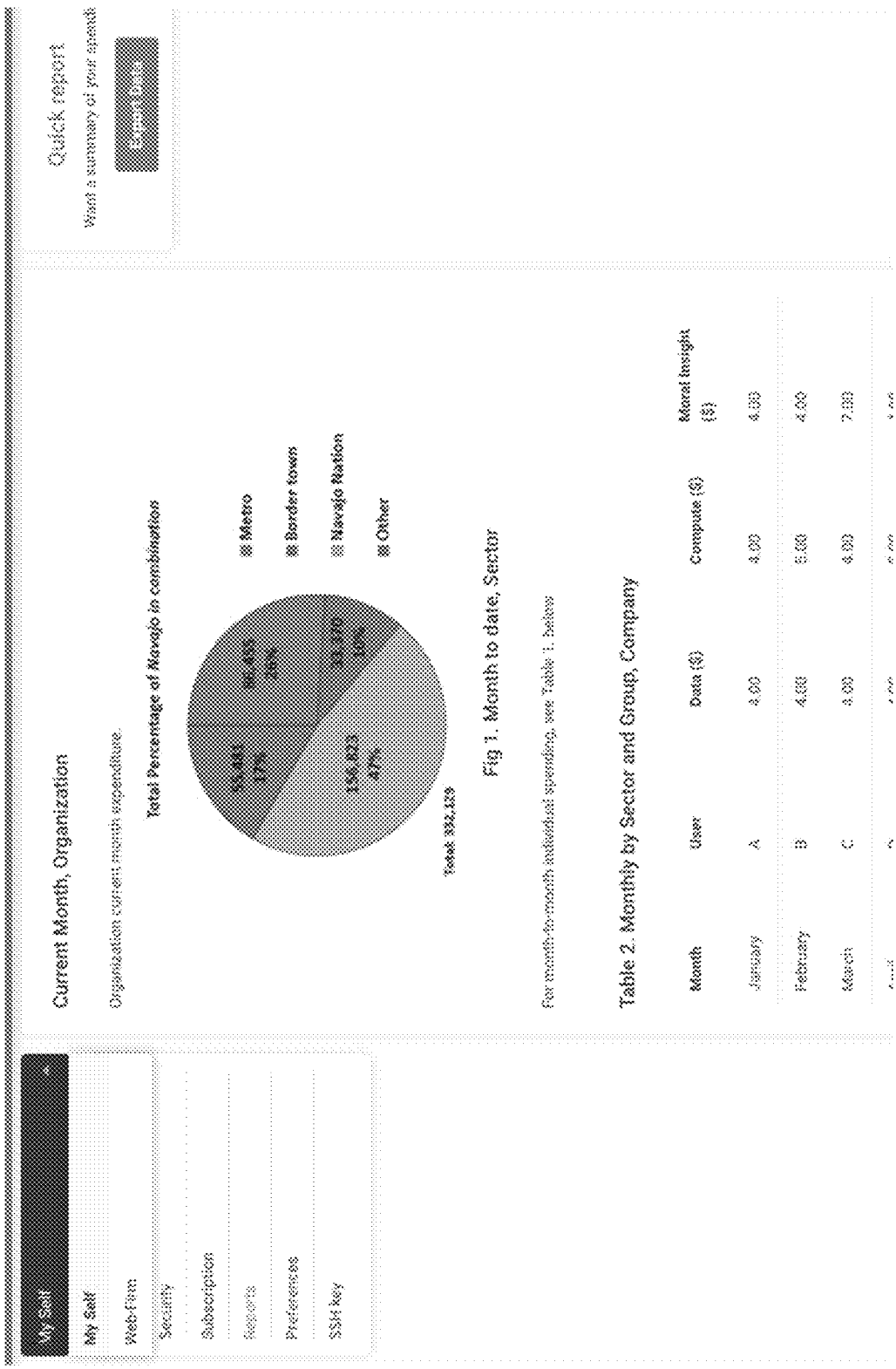
FIG. 11E presents a graphical diagram representation of a portion of a screen display in accordance with an embodiment of the present disclosure.
Figure 11F:
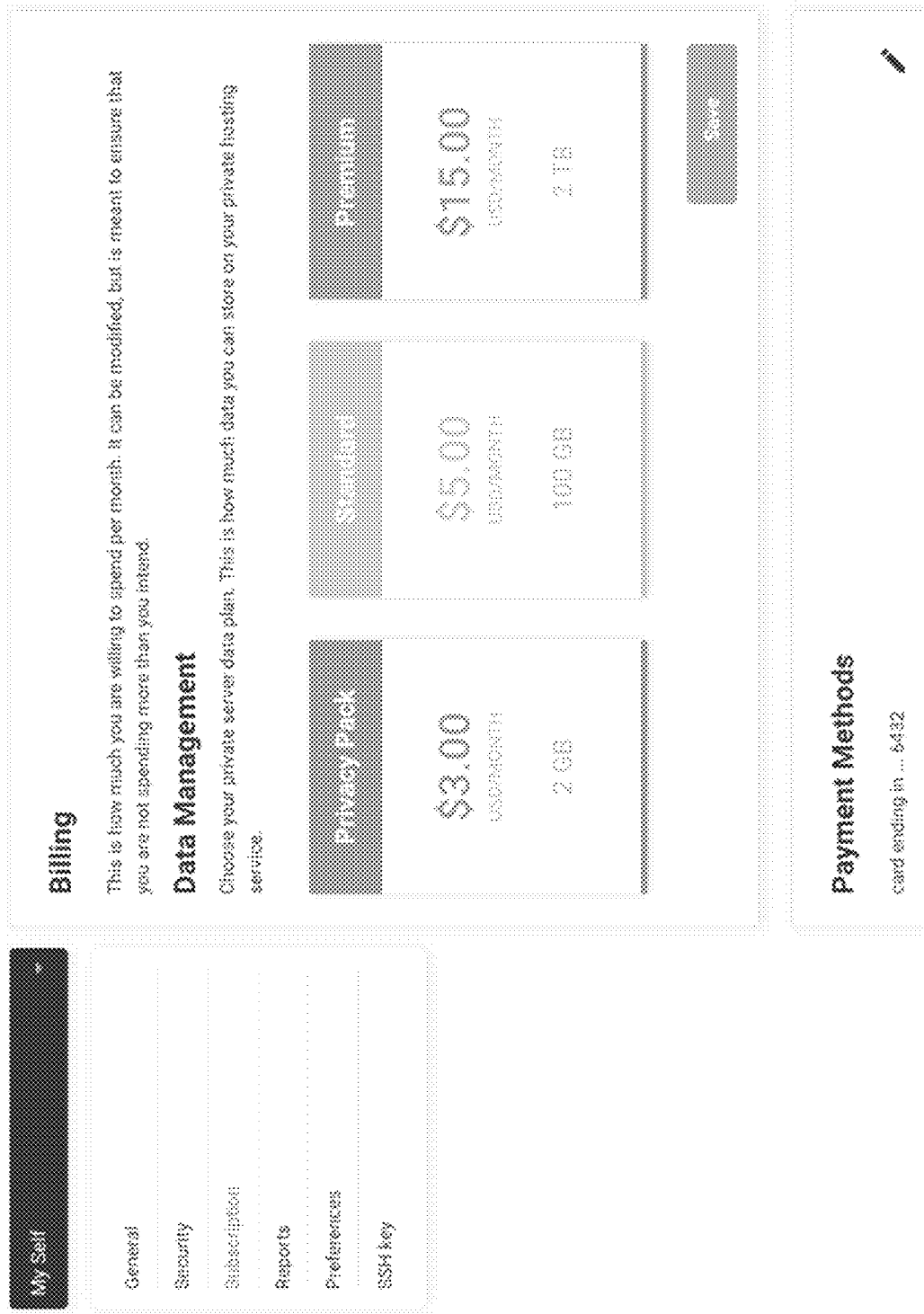
FIG. 11F presents a graphical diagram representation of a portion of a screen display in accordance with an embodiment of the present disclosure.

FIG. 10 presents a flow representation in accordance with an embodiment of the present disclosure. A further example of a cloud implementation of the system of FIG. 8A is presented. Version Control operations allow the developer to push or pull code to and from private or public server containers for production projects using, for example, Git or other version control repository. Data can be stored directly in a database of the host, facilitating quick database transactions using, for example, a graphics processing unit (GPU) or other processor. The system provides export to and from AutoML, websites like H20.ai & DataRobot with access, for example, through a C API or website with offline work and/or online work via Google Drive.

FIGS. 11A-11F present graphical diagram representations 1100, 1110, 1120, 1130, 1140 and 1150 of screen displays in accordance with an embodiment of the present disclosure. In particular, example screen displays are presented as part of the API/UX of the ethical AI development platform 800.

In various embodiments, the ethical AI development platform 800 supports a communal development framework that allows users to view repositories on people's walls, view other profiles to see public work, promote trust through transparency, allow people to be involved in decisions, add friends and follow people and organizational work, approve/disapprove work, borrow others code by forking or cloning their repository. This communal development framework also supports AI ethics discussion in ethics forums, and/or other forums where a user posts a question, others can answer, and users can comment on question and answers. Documentation can be provided in a "Learn" section which includes information on AI how to use Git, GPU Database, an AI moral insight model, etc. In various embodiments, only users/subscribers are allowed to post, but others can look at questions and answers.

In various embodiments, this communal development framework also supports a news feed that allows users to educate themselves on machine learning, ethics, current events in AI ethics, etc. Users can also create their own content. Tools can be provided to aid users in setting the tone of their contributions and otherwise to provide a guide on how to post. This communal development framework also supports organizational billing for cloud services allowing users to, for example, choose their organization with billing credentials and print out a quick report, Variable subscription plans can be offered that allow users to subscribe to the specific services and/or level of use they may need.

FIG. 12 presents a flowchart representation of a method 1200 in accordance with an embodiment of the present disclosure. In particular, a method is presented for use with any of the functions and features discussed in conjunction with FIG. 1-11. Step 1202 includes providing, via a system that includes a processor and a network interface, an ethical AI development platform that includes: a platform access subsystem that provides secure access to the ethical AI development platform to a plurality of client devices via the network interface; a learning and collaboration subsystem that provides a network-based forum that facilitates a collaborative development of machine learning tools via the plurality of client devices and that provides access to a library of AI tutorials and a database of AI news; a subscription and billing subsystem that controls access to the ethical AI development platform via each of the plurality of client devices in conjunction with subscription information associated with each of the plurality of client devices and further; that generates billing information associated with each of the plurality of client devices in accordance with the subscription information; and a privacy management system that protects the privacy of machine learning development data associated with each of the plurality of client devices.

Step 1204 includes facilitating, via the ethical AI development platform, the development of a training dataset associated with at least one of the plurality of client devices. Step 1206 includes providing, via the ethical AI development platform, access to a plurality of auto machine learning tools to facilitate the development of an AI model. Step 1208 includes providing, via the ethical AI development platform, access to a plurality of machine learning analysis tools to facilitate the evaluation of the AI model, wherein the plurality of machine learning analysis tools include at least one bias evaluation tool that predicts a bias associated with the AI model and at least one AI moral insight model that generates predicted moral score data associated with the AI model. Step 1210 includes providing, via the ethical AI development platform, access to a version control repository for storing a plurality of versions of the training dataset and the AI model.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c".

In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, quantum computing device, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium or a non-transitory machine-readable storage medium.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. An ethical AI development platform comprising:
a network interface;
a platform access subsystem configured to provide secure access to the ethical AI development platform to a plurality of client devices via the network interface;
a subscription and billing subsystem configured to control access to the ethical AI development platform via each of the plurality of client devices in conjunction with subscription information associated with each of the plurality of client devices and further; that generates billing information associated with each of the plurality of client devices in accordance with the subscription information;
a privacy management subsystem configured to protect the privacy of machine learning development data associated with each of the plurality of client devices;
a non-transitory computer readable memory configured to store operational instructions; and
at least one processor configured to execute the operational instructions, wherein the operational instructions, when executed, cause the at least one processor to perform operations that include:
facilitating the development of a training dataset associated with at least one of the plurality of client devices;
providing access to a plurality of auto machine learning tools to facilitate the development of an AI model under development;
providing access to a plurality of machine learning analysis tools to facilitate an evaluation of the AI model under development, wherein the plurality of machine learning analysis tools include an AI moral insight model that generates predicted moral score data associated with the AI model under development, wherein the AI moral insight model is trained based on at least one-hundred thousand sets of training data, wherein the training data includes reviewed media content and moral score data associated with a plurality of moral indices wherein the plurality of moral indices includes: a degree of immorality/morality, a degree of betrayal/loyalty, a degree of degradation/sanctity, a degree of harm/care a degree of cheating/fairness and a degree of subversion/authority; and
providing access to a version control repository for storing a plurality of versions of the training dataset and the AI model under development.

2. The ethical AI development platform of claim 1, wherein the plurality of machine learning analysis tools further include at least one bias evaluation tool configured to predict a bias associated with the AI model under development.

3. The ethical AI development platform of claim 1, wherein the predicted moral score data includes a plurality of scores associated with the AI model under development, each of the plurality of scores corresponding to differing ones of the plurality of moral indices.

4. The ethical AI development platform of claim 1, wherein the plurality of moral indices each represent a scale between a pair of moral opposites.

5. The ethical AI development platform of claim 1, wherein the AI moral insight model includes a plurality of artificial neural networks configured in an interconnection mesh.

6. The ethical AI development platform of claim 5, wherein the plurality of artificial neural networks generates a plurality of predicted moral index values, wherein each of the plurality of predicted moral index values corresponds to one of the plurality of moral indices.

7. The ethical AI development platform of claim 1, wherein the predicted moral score data includes a plurality of predicted moral index values, wherein each of the plurality of predicted moral index values corresponds to one of the plurality of moral indices.

8. The ethical AI development platform of claim 1, further comprising:
a learning and collaboration subsystem configured to provide a network-based forum that facilitates a collaborative development of machine learning tools via the plurality of client devices and to provides access to a library of AI tutorials and a database of AI news.

9. The ethical AI development platform of claim 1, operations further include:
generating a graphical user interface that displays instances of the reviewed media content and facilitates generation of the moral score data associated with the plurality of moral indices.

10. The ethical AI development platform of claim 9, wherein the moral score data associated with each of the plurality of moral indices is selected via the graphical user interface.

11. A method for use with an ethical AI development platform, the method comprising:

providing a platform access subsystem configured to provide secure access to the ethical AI development platform to a plurality of client devices;

providing a subscription and billing subsystem configured to control access to the ethical AI development platform via each of the plurality of client devices in conjunction with subscription information associated with each of the plurality of client devices and further; that generates billing information associated with each of the plurality of client devices in accordance with the subscription information;

providing a privacy management subsystem configured to protect the privacy of machine learning development data associated with each of the plurality of client devices;

providing a non-transitory computer readable memory configured to store operational instructions; and providing at least one processor configured to execute the operational instructions, wherein the operational instructions, when executed, cause the at least one processor to perform operations that include:

facilitating the development of a training dataset associated with at least one of the plurality of client devices;

providing access to a plurality of auto machine learning tools to facilitate the development of an AI model under development;

providing access to a plurality of machine learning analysis tools to facilitate an evaluation of the AI model under development, wherein the plurality of machine learning analysis tools include an AI moral insight model that generates predicted moral score data associated with the AI model under development, wherein the AI moral insight model is trained based on at least one-hundred thousand sets of training data, wherein the training data includes reviewed media content and moral score data associated with a plurality of moral indices wherein the plurality of moral indices includes: a degree of immorality/morality, a degree of betrayal/loyalty, a degree of degradation/sanctity, a degree of harm/care a degree of cheating/fairness and a degree of subversion/authority; and providing access to a version control repository for storing a plurality of versions of the training dataset and the AI model under development.

12. The method of claim 11, wherein the plurality of machine learning analysis tools further include at least one bias evaluation tool configured to predict a bias associated with the AI model under development.

13. The method of claim 11, wherein the predicted moral score data includes a plurality of scores associated with the AI model under development, each of the plurality of scores corresponding to differing ones of the plurality of moral indices.

14. The method of claim 11, wherein the plurality of moral indices each represent a scale between a pair of moral opposites.

15. The method of claim 11, wherein the AI moral insight model includes a plurality of artificial neural networks configured in an interconnection mesh.

16. The method of claim 15, wherein the plurality of artificial neural networks generates a plurality of predicted moral index values, wherein each of the plurality of predicted moral index values corresponds to one of the plurality of moral indices.

17. The method of claim 11, wherein the predicted moral score data includes a plurality of predicted moral index values, wherein each of the plurality of predicted moral index values corresponds to one of the plurality of moral indices.

18. The method of claim 11, further comprising:

a learning and collaboration subsystem configured to provide a network-based forum that facilitates a collaborative development of machine learning tools via the plurality of client devices and to provides access to a library of AI tutorials and a database of AI news.

19. The method of claim 11, operations further include:

generating a graphical user interface that displays instances of the reviewed media content and facilitates generation of the moral score data associated with the plurality of moral indices.

20. The method of claim 19, wherein the moral score data associated with each of the plurality of moral indices is selected via the graphical user interface.

* * * * *